(12) United States Patent
Beckett et al.

(10) Patent No.: US 12,239,980 B2
(45) Date of Patent: *Mar. 4, 2025

(54) IMPLEMENTING BARRIERS FOR CONTROLLED ENVIRONMENTS DURING SAMPLE PROCESSING AND DETECTION

(71) Applicant: Ultima Genomics, Inc., Newark, CA (US)

(72) Inventors: Nathan Beckett, Oakland, CA (US); Nathan Caswell, Sunnyvale, CA (US)

(73) Assignee: Ultima Genomics, Inc., Fremont, CA (US)

(*) Notice: Subject to any disclaimer, the term of this patent is extended or adjusted under 35 U.S.C. 154(b) by 530 days.

This patent is subject to a terminal disclaimer.

(21) Appl. No.: 17/336,377

(22) Filed: Jun. 2, 2021

(65) Prior Publication Data

US 2021/0354126 A1    Nov. 18, 2021

Related U.S. Application Data

(63) Continuation of application No. PCT/US2019/064916, filed on Dec. 6, 2019, which is a continuation-in-part of application No. 16/665,540, filed on Oct. 28, 2019, now Pat. No. 11,396,015, and a continuation-in-part of application No. 16/665,559, filed on Oct. 28, 2019, now Pat. No. 11,648,554, and a continuation-in-part of application No. 16/440,026, filed on Jun. 13, 2019, now Pat. No. 10,512,911.

(60) Provisional application No. 62/776,866, filed on Dec. 7, 2018.

(51) Int. Cl.
*B01L 3/00* (2006.01)
*G01N 7/02* (2006.01)

(52) U.S. Cl.
CPC ..... *B01L 3/50273* (2013.01); *B01L 3/502715* (2013.01); *G01N 7/02* (2013.01)

(58) Field of Classification Search
CPC .......... B01L 3/50273; B01L 3/502715; B01L 1/025; B01L 2200/141; G01N 7/02; G01N 21/0332; G01N 21/6452; G01N 21/01; G01N 15/10
See application file for complete search history.

(56) References Cited

U.S. PATENT DOCUMENTS

| | | |
|---|---|---|
| 3,707,723 A | 12/1972 | Levene |
| 4,611,881 A | 9/1986 | Schmidt et al. |
| 5,216,247 A | 6/1993 | Wang et al. |
| 5,307,146 A | 4/1994 | Porter et al. |
| 5,409,811 A | 4/1995 | Tabor et al. |
| 5,641,006 A | 6/1997 | Autrey et al. |
| 5,641,658 A | 6/1997 | Adams et al. |
| 5,674,716 A | 10/1997 | Tabor et al. |
| 5,800,997 A | 9/1998 | Beck |
| 6,139,831 A | 10/2000 | Shivashankar et al. |
| 6,320,609 B1 | 11/2001 | Buchanan et al. |
| 6,466,352 B1 | 10/2002 | Shahar et al. |
| 6,737,238 B2 | 5/2004 | Suzuki et al. |
| 6,743,578 B1 | 6/2004 | Castro |
| 7,623,289 B2 | 11/2009 | Harada |
| 7,689,022 B2 | 3/2010 | Weiner et al. |
| 7,906,285 B2 | 3/2011 | Drmanac |
| 7,939,264 B1 | 5/2011 | Densham |
| 8,431,903 B2 | 4/2013 | Duhr et al. |
| 8,475,739 B2 | 7/2013 | Holmes et al. |
| 8,574,847 B2 | 11/2013 | Becker et al. |
| 8,597,882 B2 | 12/2013 | Corbett et al. |
| 8,772,473 B2 | 7/2014 | Huang et al. |
| 9,795,961 B1 | 10/2017 | Koh et al. |
| 9,891,177 B2 | 2/2018 | Vazhaeparambil et al. |
| 10,267,790 B1 | 4/2019 | Barbee et al. |
| 10,273,528 B1 | 4/2019 | Barbee et al. |
| 10,344,328 B2 | 7/2019 | Barbee et al. |
| 10,512,911 B1 | 12/2019 | Beckett et al. |
| 10,830,703 B1 | 11/2020 | Almogy et al. |
| 10,852,518 B1 | 12/2020 | Almogy et al. |

(Continued)

FOREIGN PATENT DOCUMENTS

| | | |
|---|---|---|
| CN | 103547255 A | 1/2014 |
| CN | 107735664 A | 2/2018 |

(Continued)

OTHER PUBLICATIONS

EP20770906.4 Extended European Search Report dated Feb. 20, 2023.
Britannica, The Editors of Encyclopedia. "fluid". Encyclopedia Britannica, May 11, 2021, https://www.britannica.com/science/fluid-physics. Accessed on Jan. 21, 2022.
PCT/US2021/052902 International Search Report and Written Opinion dated Feb. 17, 2022.
U.S. Appl. No. 16/665,540 Non-Final Office Action dated Jan. 10, 2022.
U.S. Appl. No. 16/665,559 Non-Final Office Action dated Feb. 7, 2022.
Adessi et al. Solid phase DNA amplification: Charcterisation of primer attachment and amplification mechanisms, Nucl. Acids Res, 2000, 28(20):E87.

(Continued)

*Primary Examiner* — Narayan K Bhat
(74) *Attorney, Agent, or Firm* — Wilson Sonsini Goodrich & Rosati

(57) ABSTRACT

Provided herein are methods for processing and/or detecting a sample. A method can comprise providing a barrier between a first region and a second region, wherein the first region comprises the sample, wherein the barrier maintains the first region at a first atmosphere that is different than a second atmosphere of the second region, wherein a portion of the barrier comprises a fluid in coherent motion; and using a detector at least partially contained in the first region to detect one or more signals from the sample while the first region is maintained at the first atmosphere that is different than the second atmosphere of the second region. The portion of the barrier comprising fluid may have a pressure lower than the first atmosphere, the second atmosphere, or both.

20 Claims, 12 Drawing Sheets

(56) References Cited

U.S. PATENT DOCUMENTS

| | | |
|---|---|---|
| 10,900,078 B2 | 1/2021 | Almogy et al. |
| 11,118,223 B2 | 9/2021 | Almogy et al. |
| 11,155,868 B2 | 10/2021 | Almogy et al. |
| 11,268,143 B2 | 3/2022 | Beckett et al. |
| 11,396,015 B2 | 7/2022 | Beckett et al. |
| 11,499,962 B2 | 11/2022 | Barbee et al. |
| 11,512,350 B2 | 11/2022 | Almogy et al. |
| 11,591,651 B2 | 2/2023 | Almogy et al. |
| 11,648,554 B2 | 5/2023 | Beckett et al. |
| 11,732,298 B2 | 8/2023 | Almogy et al. |
| 11,747,323 B2 | 9/2023 | Barbee et al. |
| 2002/0006622 A1* | 1/2002 | Bradley ............... C12Q 1/6832 435/6.11 |
| 2002/0009015 A1* | 1/2002 | Laugharn, Jr. .......... B01F 35/71 366/108 |
| 2002/0022261 A1 | 2/2002 | Anderson et al. |
| 2002/0055112 A1 | 5/2002 | Patil et al. |
| 2002/0064780 A1* | 5/2002 | Gold ................ C12N 15/1048 435/6.12 |
| 2002/0072243 A1* | 6/2002 | Craighead ....... G01N 27/44791 438/48 |
| 2002/0074517 A1 | 6/2002 | Krutchinsky et al. |
| 2002/0168652 A1 | 11/2002 | Werner et al. |
| 2002/0172980 A1 | 11/2002 | Phan et al. |
| 2002/0177144 A1 | 11/2002 | Remacle et al. |
| 2003/0054376 A1 | 3/2003 | Mullis et al. |
| 2003/0193589 A1 | 10/2003 | Lareau et al. |
| 2004/0071888 A1 | 4/2004 | Chondroudis et al. |
| 2005/0037484 A1 | 2/2005 | Staimer et al. |
| 2005/0186580 A1 | 8/2005 | Dellinger et al. |
| 2005/0237480 A1 | 10/2005 | Allbritton et al. |
| 2006/0078934 A1* | 4/2006 | Desmet ................. B01F 25/431 435/7.1 |
| 2006/0078935 A1 | 4/2006 | Werner et al. |
| 2006/0263791 A1 | 11/2006 | Moon et al. |
| 2007/0031856 A1 | 2/2007 | Hong |
| 2007/0099289 A1 | 5/2007 | Irimia et al. |
| 2007/0275193 A1 | 11/2007 | DeSimone et al. |
| 2007/0290702 A1 | 12/2007 | Lee |
| 2007/0291354 A1 | 12/2007 | Harada |
| 2008/0038163 A1* | 2/2008 | Boege ...................... B01L 7/52 422/600 |
| 2008/0242560 A1 | 10/2008 | Gunderson et al. |
| 2008/0254259 A1 | 10/2008 | Nishi et al. |
| 2009/0098541 A1 | 4/2009 | Southern et al. |
| 2009/0135385 A1 | 5/2009 | Gellrich et al. |
| 2009/0263002 A1 | 10/2009 | Cremer et al. |
| 2009/0263807 A1 | 10/2009 | Yotoriyama |
| 2009/0305431 A1 | 12/2009 | Hodges et al. |
| 2009/0308742 A1 | 12/2009 | Paranjape |
| 2010/0041562 A1 | 2/2010 | Li et al. |
| 2010/0044586 A1 | 2/2010 | Duhr et al. |
| 2010/0101104 A1 | 4/2010 | Grzesiak et al. |
| 2010/0151564 A1 | 6/2010 | Beebe et al. |
| 2010/0167308 A1 | 7/2010 | Miller et al. |
| 2010/0210475 A1 | 8/2010 | Lee et al. |
| 2010/0330578 A1 | 12/2010 | Duhr et al. |
| 2011/0000560 A1 | 1/2011 | Miller et al. |
| 2011/0086361 A1* | 4/2011 | Klunder ............... C12Q 1/6834 435/6.12 |
| 2011/0178285 A1 | 7/2011 | Lebl et al. |
| 2011/0312622 A1* | 12/2011 | Azimi ................... F16K 99/003 506/39 |
| 2012/0068059 A1 | 3/2012 | Montes Usategui et al. |
| 2012/0126142 A1 | 5/2012 | Matsui et al. |
| 2012/0282708 A1 | 11/2012 | Corbett et al. |
| 2012/0316074 A1 | 12/2012 | Saxonov |
| 2013/0005585 A1 | 1/2013 | Anderson et al. |
| 2013/0038719 A1 | 2/2013 | Canini |
| 2013/0076852 A1 | 3/2013 | Bai et al. |
| 2013/0203049 A1 | 8/2013 | Corbett et al. |
| 2014/0152888 A1 | 6/2014 | Staker et al. |
| 2014/0162275 A1 | 6/2014 | Kotseroglou |
| 2014/0261577 A1 | 9/2014 | Furukawa et al. |
| 2014/0287423 A1 | 9/2014 | Nurse |
| 2015/0071898 A1 | 3/2015 | Liu et al. |
| 2015/0125346 A1 | 5/2015 | Schaff et al. |
| 2015/0212310 A1 | 7/2015 | Fukuda et al. |
| 2015/0270146 A1 | 9/2015 | Yoshihara et al. |
| 2016/0032380 A1 | 2/2016 | Craighead et al. |
| 2016/0041135 A1 | 2/2016 | Lannutti et al. |
| 2016/0061733 A1 | 3/2016 | Wu et al. |
| 2016/0076025 A1 | 3/2016 | Boutell et al. |
| 2016/0076978 A1 | 3/2016 | Dave et al. |
| 2016/0097727 A1 | 4/2016 | Vazhaeparambil et al. |
| 2016/0168626 A1* | 6/2016 | Danehy ............... B01L 3/50855 435/6.12 |
| 2016/0184870 A1 | 6/2016 | Miura et al. |
| 2016/0246170 A1 | 8/2016 | Bowen et al. |
| 2016/0314575 A1 | 10/2016 | Matsuo et al. |
| 2016/0319334 A1 | 11/2016 | Barany et al. |
| 2017/0123198 A1 | 5/2017 | Singer et al. |
| 2017/0136434 A1 | 5/2017 | Barnard et al. |
| 2018/0207920 A1 | 7/2018 | Venkatesan et al. |
| 2019/0153531 A1 | 5/2019 | Barbee et al. |
| 2019/0271038 A1 | 9/2019 | Almogy et al. |
| 2019/0271039 A1 | 9/2019 | Almogy et al. |
| 2019/0291115 A1 | 9/2019 | Kaplan et al. |
| 2019/0331903 A1 | 10/2019 | Wald et al. |
| 2020/0164379 A1 | 5/2020 | Kaplan et al. |
| 2020/0179925 A1 | 6/2020 | Beckett et al. |
| 2020/0179926 A1 | 6/2020 | Beckett et al. |
| 2020/0291469 A1 | 9/2020 | Almogy et al. |
| 2020/0326327 A1 | 10/2020 | Barbee et al. |
| 2020/0363338 A1 | 11/2020 | Almogy et al. |
| 2021/0047688 A1 | 2/2021 | Almogy et al. |
| 2021/0054454 A1 | 2/2021 | Almogy et al. |
| 2021/0079464 A1 | 3/2021 | Beckett et al. |
| 2021/0139980 A1 | 5/2021 | Almogy et al. |
| 2022/0064727 A1 | 3/2022 | Almogy et al. |
| 2022/0162696 A1 | 5/2022 | Beckett et al. |

FOREIGN PATENT DOCUMENTS

| | | |
|---|---|---|
| EP | 0865606 A1 | 9/1998 |
| JP | 2000304688 A | 11/2000 |
| JP | 2005345597 A | 12/2005 |
| JP | 2008262983 A | 10/2008 |
| JP | 2010117712 A | 5/2010 |
| JP | 2010536009 A | 11/2010 |
| JP | 2012522225 A | 9/2012 |
| JP | 2015529858 A | 10/2015 |
| JP | 2018511338 A | 4/2018 |
| JP | 2018516591 A | 6/2018 |
| JP | 2018143154 A | 9/2018 |
| WO | WO-0037680 A1 | 6/2000 |
| WO | WO-0039625 A2 | 7/2000 |
| WO | WO-0039625 A3 | 10/2000 |
| WO | WO-03102535 A2 | 12/2003 |
| WO | WO-03102535 A3 | 3/2004 |
| WO | WO-2008016335 A1 | 2/2008 |
| WO | WO-2014127379 A1 | 8/2014 |
| WO | WO-2014143981 A1 | 9/2014 |
| WO | WO-2014143981 A9 | 12/2014 |
| WO | WO-2015119254 A1 | 8/2015 |
| WO | WO-2014143981 A8 | 12/2015 |
| WO | WO-2016161163 A2 | 10/2016 |
| WO | WO-2016168687 A1 | 10/2016 |
| WO | WO-2018064297 A1 | 4/2018 |
| WO | WO-2018144582 A1 | 8/2018 |
| WO | WO-2019099886 A1 | 5/2019 |
| WO | WO-2020034143 A1 | 2/2020 |
| WO | WO-2020118172 A1 | 6/2020 |
| WO | WO-2020186243 A1 | 9/2020 |
| WO | WO-2022072652 A1 | 4/2022 |

OTHER PUBLICATIONS

BIOPTECHS. Product information for the BIOPTECHS Objective Heather. Available at http://bioptechs.com/product/objective-heater/. Accessed on Jun. 25, 2019.

(56) References Cited

OTHER PUBLICATIONS

Brenner, et al. Gene expression analysis by massively parallel signature sequencing (MPSS) on microbead arrays. Nat Biotechnol. Jun. 2000; 18(6):630-4.
Brenner et al. In vitro cloning of complex mixtures of DNA on microbeads: Physical separation of differentially expressed cDNAs, Proc. Natl. Acad. Sci. USA 2000, 97(4): 1665-1670.
Co-pending U.S. Appl. No. 17/001,174, inventors Almogy; Gilad et al., filed Aug. 24, 2020.
Co-pending U.S. Appl. No. 17/003,400, inventors Almogy; Gilad et al., filed Aug. 26, 2020.
Co-pending U.S. Appl. No. 17/181,378, inventors Beckett; Nathan et al., filed Feb. 22, 2021.
Co-pending U.S. Appl. No. 17/308,241, inventors Beckett; Nathan et al., filed May 5, 2021.
Dressman, et al. Transforming single DNA molecules into fluorescent magnetic particles for detection and enumeration of genetic variations. Proc Natl Acad Sci USA. 2003;100(15):8817-8822.
European Search Report, EP Application No. EP20180878612 dated Jul. 14, 2021.
Lizardi, et al. Mutation detection and single-molecule counting using isothermal rolling-circle amplification. Nat Genet. Jul. 1998; 19(3):225-32.
MIT Technology Review. China's BGI says it can sequence a genome for just $100. Available at https://www.technologyreview.com/2020/02/26/905658/china-bgi-100-dollar-genome. Accessed on Feb. 19, 2021.
Mitra, et al. Digital genotyping and haplotyping with polymerase colonies. Proc Natl Acad Sci USA. 2003.100(10):15926-5931.
Mitra et al. Fluorescent in situ sequencing on polymerase colonies, Anal. Biochem, 320:55-65. (2003).
PCT/US020/022816 International Search Report dated Jul. 30, 2020.
PCT/US18/61598 International Search Report and Written Opinion dated Mar. 15, 2019.
PCT/US2019/064916 International Search Report dated Apr. 7, 2020.
Pemov et al. DNA analysis with multiplex microarray-enhanced PCR, Nucl. Acids Res, 2005, 33(2):e11, pp. 1-9.
Qin, et al. High-throughput, low-cost and rapid DNA sequencing using surface-coating techniques. bioRxiv (2020).
Reinartz, et al. Massively parallel signature sequencing (MPSS) as a tool for in-depth quantitative gene expression profiling in all organisms. Brief Funct Genomic Proteomic. Feb. 2002;1(1):95-104.
Spatial Transcriptomics. Workflow. Available at https://spatialtranscriptomics.com/workflow/. Accessed on Jun. 25, 2019.
Tabor, et al., Effect of manganese ions on the incorporation of dideoxynucleotides by bacteriophage T7 DNA polymerase and *Escherichia coli* DNA polymerase I, Proc. Natl. Acad. Sci. USA, Jun. 1989, 86:4076-80.
U.S. Appl. No. 15/974,364 Office Action dated Aug. 7, 2018.
U.S. Appl. No. 15/974,543 Notice of Allowance dated Dec. 13, 2018.
U.S. Appl. No. 15/974,543 Office Action dated Aug. 7, 2018.
U.S. Appl. No. 16/445,798 Notice of Allowance dated Dec. 18, 2020.
U.S. Appl. No. 16/445,798 Notice of Allowance dated Dec. 4, 2020.
U.S. Appl. No. 16/445,798 Notice of Allowance dated Sep. 18, 2020.
U.S. Appl. No. 16/445,798 Office Action dated May 8, 2020.
U.S. Appl. No. 16/677,067 Notice of Allowance dated Aug. 12, 2020.
U.S. Appl. No. 16/677,067 Notice of Allowance dated Jul. 1, 2020.
U.S. Appl. No. 16/677,067 Notice of Allowance dated Jun. 19, 2020.
U.S. Appl. No. 16/677,067 Notice of Allowance dated Sep. 21, 2020.
U.S. Appl. No. 16/677,115 Notice of Allowance dated Aug. 21, 2020.
U.S. Appl. No. 16/677,115 Notice of Allowance dated Jul. 14, 2020.
U.S. Appl. No. 16/953,071 Notice of Allowance dated May 26, 2021.
U.S. Appl. No. 16/953,071 Notice of Allowance dated May 5, 2021.
U.S. Appl. No. 16/953,071 Office Action dated Apr. 22, 2021.
U.S. Appl. No. 16/953,071 Office Action dated Jan. 15, 2021.
U.S. Appl. No. 17/155,226 Notice of Allowance dated Jul. 6, 2021.
U.S. Appl. No. 17/155,226 Office Action dated Mar. 18, 2021.
U.S. Appl. No. 17/308,241 Office Action dated Jul. 26, 2021.
U.S. Appl. No. 15/974,364 Notice of Allowance dated Feb. 28, 2019.
U.S. Appl. No. 15/974,441 Notice of Allowance dated Nov. 21, 2018.
U.S. Appl. No. 15/974,441 Office Action dated Aug. 3, 2018.
U.S. Appl. No. 16/440,026 Notice of Allowance dated Sep. 3, 2019.
U.S. Appl. No. 16/445,798 Office Action dated Nov. 6, 2019.
U.S. Appl. No. 16/677,067 Office Action dated Feb. 28, 2020.
U.S. Appl. No. 16/677,115 Office Action dated Mar. 24, 2020.
Co-pending U.S. Appl. No. 17/962,163, inventors Barbee; Kristopher et al., filed Oct. 7, 2022.
EP19894196.5 European Search Report dated Aug. 12, 2022.
He, R-Y., et al. Study of cell adhesion and migration by using a plasmon-enhanced total internal reflection fluorescence microscope. Imaging, Manipulation, and Analysis of Biomolecules, Cells, and Tissues IV. vol. 6088. SPIE (2006).
U.S. Appl. No. 16/416,856 Final Office Action dated Oct. 5, 2022.
U.S. Appl. No. 16/862,196 Notice of Allowance dated Jul. 7, 2022.
Spencer, Harold, and F.R.S. Jones. Variations of the Earth's Rotation. Physics and Chemistry of the Earth, vol. 4 (1961): 186-210.
U.S. Appl. No. 17/543,521 Office Action dated Oct. 12, 2023.
Explanation of "Probe" in the Dictionary of Nutrition and Biochemistry. Retrieved from website on Jun. 30, 2023: https://kotobank.jp/word/%E3%83%97%E3%83%AD%E3%83%BC%E3%83%96-675975.
U.S. Appl. No. 16/416,889 Office Action dated Mar. 26, 2024.
U.S. Appl. No. 17/543,521 Notice of Allowance dated Jun. 5, 2024.
U.S. Appl. No. 18/224,378 Notice of Allowance dated Apr. 29, 2024.
U.S. Appl. No. 18/224,378 Office Action dated Feb. 29, 2024.

\* cited by examiner

IMPLEMENTING BARRIERS FOR CONTROLLED ENVIRONMENTS DURING SAMPLE PROCESSING AND DETECTION

CROSS-REFERENCE

This application is a Continuation Application of International Application No. PCT/US19/64916, filed Dec. 6, 2019, which claims the benefit of U.S. patent application Ser. No. 16/665,559, filed Oct. 28, 2019, U.S. patent application Ser. No. 16/665,540, filed Oct. 28, 2019, U.S. patent application Ser. No. 16/440,026, filed Jun. 13, 2019, and U.S. Provisional Patent Application No. 62/776,866, filed Dec. 7, 2018, each of which is entirely incorporated herein by reference.

BACKGROUND

Biological sample processing has various applications in the fields of molecular biology and medicine (e.g., diagnosis). For example, nucleic acid sequencing may provide information that may be used to diagnose a certain condition in a subject and in some cases tailor a treatment plan. Sequencing is widely used for molecular biology applications, including vector designs, gene therapy, vaccine design, industrial strain design and verification. Biological sample processing may involve a fluidics system and/or a detection system.

SUMMARY

Samples, including biologic samples and non-biologic samples, may be processed in a controlled environment, such as with a controlled temperature, pressure, and/or humidity. Analysis of such samples may involve detecting the samples within the controlled environment. Detection may involve continuous detection (e.g., continuous scanning), where there is continuous relative motion between a detector (e.g., optical head) and a sample. Detection may require proximity between an objective lens and the sample, such as to achieve direct or indirect contact between the objective lens and the sample. However, detection activities, such as the act of continuously scanning a sample, may disrupt the controlled environment. In some instances, efforts to maintain the controlled environment may disrupt the continuous motion of one or more detectors. In some instances, it may not be possible to move a detector within the controlled environment while maintaining the controlled environment because, for example, the presence or motion of the detector may make it difficult or impossible to seal or maintain the controlled environment, or the presence or motion of the detector may affect the sample, thus impacting the detection results. In some instances, implementing a mechanical seal, such as bellows or sliding gaskets, to maintain the controlled environment from the normal environment (e.g., room environment), may introduce unwanted forces during the detection and impede or disrupt the relative motion between the detector and the sample. Such problems may yield inaccurate and imprecise detection results. Therefore, recognized herein is a need for systems, devices, and methods that address at least the abovementioned problems.

Provided herein are barriers that can be implemented between a controlled sample environment and the external environment. Such barriers may allow for low friction or zero friction relative motion between the detector and the sample while maintaining a controlled sample environment. The barriers may allow for an objective lens to directly or indirectly (e.g., via immersion in a fluid) contact the sample during detection and movement. The barriers may allow for continuous scanning involving relative motion in a non-linear direction (e.g., in an R, 0 coordinate system) and/or linear direction (e.g., in an X, Y, and/or Z coordinate system). Beneficially, such barriers may allow for continuous scanning in a 100% or substantially 100% relative humidity environment. The barriers may prevent humidity from escaping the sample environment, which when escaped can condense and affect (e.g., corrode, foul, etc.) sensitive equipment, such as the optics and electronics. Furthermore, the barriers may prevent contaminants from the external environment from entering the sample environment, which may contaminate the sample and/or affect the fluidics and/or detection (e.g., imaging).

A barrier may comprise a transition region between the sample environment and the external environment. The barrier may comprise a fluid barrier. The barrier may comprise fluids from the sample environment, the external environment, or both. The barrier may be a low pressure region. The low pressure region may have lower pressure than the sample environment, the external environment, or both. The barrier may comprise a partial vacuum. The barrier may further comprise a physical barrier.

In an aspect, provided is a method for processing a biological analyte, comprising: (a) providing a barrier between a first region and a second region, wherein the first region comprises a substrate having the biological analyte immobilized adjacent thereto, wherein the barrier maintains the first region at a first atmosphere that is different than a second atmosphere of the second region; and (b) using a detector at least partially contained in the first region to detect one or more signals or changes thereof from the biological analyte while (i) the detector is undergoing motion relative to the substrate, wherein the substrate and the detector are not in direct mechanical contact, and (ii) the first region is maintained at the first atmosphere that is different than the second atmosphere of the second region.

In some embodiments, a portion of the barrier comprises fluid in bulk motion. In some embodiments, the fluid comprises air. In some embodiments, the portion of the barrier comprises a partial vacuum. In some embodiments, the portion of the barrier comprises fluid from the first region, the second region, or both.

In some embodiments, the first atmosphere is maintained at a first humidity or first humidity range that is different than a second humidity or second humidity range of the second atmosphere. In some embodiments, the first atmosphere has a relative humidity greater than 90%.

In some embodiments, the first atmosphere is maintained at a first temperature or first temperature range that is different than a second temperature or second temperature range of the second atmosphere.

In some embodiments, the first region comprises a first part and a second part, wherein the first part is maintained at a first local atmosphere, and wherein the second part is maintained at a second local atmosphere different than the first local atmosphere. In some embodiments, the first local atmosphere is maintained at a first local temperature or first local temperature range that is different than a second local temperature or second local temperature range of the second local atmosphere. In some embodiments, the first local atmosphere is maintained at a first local humidity or first local humidity range that is different than a second local humidity or second local humidity range of the second local atmosphere.

In some embodiments, detector is an optical detector, and wherein the one or more signals are one or more optical signals or signal changes.

In some embodiments, the barrier comprises a first solid component and a second solid component, wherein the first solid component and the second solid component are not in direct mechanical contact, and wherein the first solid component is movable relative to the second solid component. In some embodiments, a portion of the barrier comprises fluid in bulk motion, and wherein the portion is disposed between the first solid component and the second solid component.

In some embodiments, the detector is fixed relative to the first solid component and wherein the substrate is translationally fixed relative to the second solid component.

In some embodiments, the substrate is rotatable relative to the second solid component.

In some embodiments, a first part of the first solid component is provided between the first region and the second region, and wherein a second part of the first solid component is provided between the second region and a third region to form part of another barrier configured to maintain the third region at a third atmosphere that is independent of the first atmosphere and the second atmosphere, wherein a portion of the another barrier comprises fluid in bulk motion, and wherein the third region is movable relative to the first solid component independent of the first region.

In some embodiments, the second atmosphere is a room atmosphere or an ambient atmosphere.

In some embodiments, a first part of the detector is in the first region and a second part of the detector is in the second region. In some embodiments, the first part of the detector comprises an optical imaging objective at least partially immersed in an immersion fluid in contact with the substrate in the first region.

In some embodiments, the biological analyte is a nucleic acid molecule, and further comprising, based at least in part on the one or more signals or changes thereof, identifying a sequence of the nucleic acid molecule or derivative thereof.

In some embodiments, motion comprises one or more members selected from the group consisting of (i) substantially linear motion and (ii) substantially non-linear motion relative to the substrate.

In some embodiments, the detector is undergoing rotational motion relative to the substrate.

In some embodiments, the detector is undergoing translational motion relative to the substrate.

In some embodiments, the detector is undergoing translational motion and rotational motion relative to the substrate.

In some embodiments, in (b), the detector scans the substrate along a substantially linear scan path.

In some embodiments, in (b), the detector scans the substrate along a substantially non-linear scan path. In some embodiments, in (b), the detector scans the substrate along one or more scan paths selected from the group consisting of a ring, a spiral, and an arc.

In another aspect, provided is a method for processing a biological analyte, comprising: (a) providing a barrier between a first region and a second region, wherein the first region comprises the biological analyte, wherein the barrier maintains the first region at a first atmosphere that is different than a second atmosphere of the second region, wherein a portion of the barrier comprises fluid in bulk motion; and (b) using a detector at least partially contained in the first region to detect one or more signals or change thereof from the biological analyte while the first region is maintained at the first atmosphere that is different than the second atmosphere of the second region.

In some embodiments, the portion of the barrier comprises fluid from the first region, the second region, or both.

In some embodiments, the first atmosphere is maintained at a first humidity or first humidity range that is different than a second humidity or second humidity range of the second atmosphere. In some embodiments, the first atmosphere has a relative humidity greater than 90%.

In some embodiments, the first atmosphere is maintained at a first temperature or first temperature range that is different than a second temperature or second temperature range of the second atmosphere.

In some embodiments, the first region comprises a first part and a second part, wherein the first part is maintained at a first local atmosphere, and wherein the second part is maintained at a second local atmosphere different than the first local atmosphere. In some embodiments, the first local atmosphere is maintained at a first local temperature or first local temperature range that is different than a second local temperature or second local temperature range of the second local atmosphere. In some embodiments, the first local atmosphere is maintained at a first local humidity or first local humidity range that is different than a second local humidity or second local humidity range of the second local atmosphere.

In some embodiments, (b) comprises moving the detector relative to the biological analyte while detecting.

In some embodiments, the detector is an optical detector, and wherein the one or more signals or change thereof are one or more optical signals or change thereof.

In some embodiments, the barrier comprises a first solid component and a second solid component, wherein the first solid component and the second solid component are not in mechanical contact, and wherein the first solid component is movable relative to the second solid component. In some embodiments, the portion of the barrier comprising the fluid is disposed between the first solid component and the second solid component.

In some embodiments, the detector is fixed relative to the first solid component and wherein the biological analyte is translationally fixed relative to the second solid component.

In some embodiments, a first part of the first solid component is provided between the first region and the second region, and wherein a second part of the first solid component is provided between the second region and a third region to form part of another barrier configured to maintain the third region at a third atmosphere that is independent of the first atmosphere and the second atmosphere, wherein a portion of the another barrier comprises fluid, and wherein the third region is movable relative to the first solid component independent of the first region.

In some embodiments, the second atmosphere is a room atmosphere or an ambient atmosphere.

In some embodiments, a first part of the detector is in the first region and a second part of the detector is in the second region. In some embodiments, the first part of the detector comprises an optical imaging objective at least partially immersed in an immersion fluid in contact with the biological analyte in the first region.

In some embodiments, biological analyte is a nucleic acid molecule, and further comprising, based at least in part on the one or more signals or signal changes, identifying a sequence of the nucleic acid molecule or derivative thereof.

In some embodiments, the fluid comprises air.

In another aspect, provided is a system for processing an analyte, comprising: a first region configured to contain (i)

a substrate comprising the analyte immobilized adjacent thereto and (ii) at least a portion of a detector; and a barrier disposed between the first region and a second region, wherein the barrier is configured to maintain the first region at a first atmosphere that is different than a second atmosphere of the second region while the detector and the substrate are undergoing relative motion with respect to one another, to detect one or more signals or change thereof from the analyte.

In some embodiments, a portion of the barrier is configured to comprise fluid in bulk motion. In some embodiments, the portion of the barrier is configured to be under vacuum. In some embodiments, the portion of the barrier is configured to comprise fluid from the first region, the second region, or both the first region and the second region.

In some embodiments, a portion of the barrier is configured to comprise air.

In some embodiments, the barrier is configured to maintain the first region at a first humidity or first humidity range, wherein the first humidity or first humidity range is different than a second humidity or second humidity range of the second region. In some embodiments, the first atmosphere has a relative humidity greater than 90%.

In some embodiments, the barrier is configured to maintain the first region at a first temperature or first temperature range, wherein the first temperature or first temperature range is different than a second temperature or second temperature range of the second region.

In some embodiments, the first region comprises a first part and a second part, wherein the barrier is configured to maintain the first part at a first local atmosphere and maintain the second part at a second local atmosphere different than the first local atmosphere. In some embodiments, the barrier is configured to maintain the first local atmosphere at a first local temperature or first local temperature range that is different than a second local temperature or second local temperature range of the second local atmosphere. In some embodiments, the barrier is configured to maintain the first local atmosphere at a first local humidity or first local humidity range that is different than a second local humidity or second local humidity range of the second local atmosphere.

In some embodiments, the detector is at least partially contained in the first region. In some embodiments, the detector is an optical detector, and wherein the one or more signals are one or more optical signals or signal change. In some embodiments, a first portion of the detector is in the first region and a second portion of the detector is in the second region. In some embodiments, the first portion of the detector comprises an optical imaging objective that is configured to be at least partially immersed in an immersion fluid in contact with the substrate when the substrate is in the first region. In some embodiments, the detector is configured to undergo motion while the substrate is stationary. In some embodiments, the substrate is configured to undergo motion while the detector is stationary.

In some embodiments, the barrier comprises a first solid component and a second solid component, wherein the first solid component and the second solid component are not in direct mechanical contact with one another, and wherein the first solid component and the second solid component are movable relative to one another. In some embodiments, a portion of the barrier is configured to comprise fluid in bulk motion, and wherein the portion is disposed between the first solid component and the second solid component.

In some embodiments, the detector is configured to be fixed relative to the first solid component, and wherein the substrate is configured to be fixed relative to the second solid component.

In some embodiments, the detector is configured to be fixed relative to the first solid component, and wherein the substrate is configured to be rotatable relative to the second solid component.

In some embodiments, a first portion of the first solid component is provided between the first region and the second region, and wherein a second portion of the first solid component is provided between the second region and a third region to form a portion of another barrier configured to maintain the third region at a third atmosphere that is independent of the first atmosphere and the second atmosphere, wherein a portion of the another barrier comprises fluid in bulk motion, and wherein the third region is movable relative to the first solid component independent of the first region.

In some embodiments, the second atmosphere is a room atmosphere or an ambient atmosphere.

In another aspect, provided is a system for processing or analyzing an analyte, comprising: a chamber and a lid, wherein the chamber comprises a first region configured to contain (1) a substrate comprising the analyte immobilized adjacent thereto, and (2) at least a portion of a detection unit, and wherein the lid is configured to be disposed adjacent to the chamber; and a fluid flow unit configured to provide fluid in bulk motion at a location disposed between the chamber and the lid when the lid is disposed adjacent to the chamber, such that the first region is maintained at a first atmosphere that is different than a second atmosphere of a second region external to the first region.

In some embodiments, the fluid in bulk motion is configured to provide a partial vacuum between the chamber and the lid.

In some embodiments, the fluid flow unit is configured to use fluid from the first region, the second region, or both to provide the fluid in bulk motion.

In some embodiments, the fluid comprises air.

In some embodiments, wherein the fluid flow unit is configured to maintain the first region at a first humidity or first humidity range, wherein the first humidity or first humidity range is different than a second humidity or second humidity range of the second region. In some embodiments, the first atmosphere has a relative humidity greater than 90%.

In some embodiments, the fluid flow unit is configured to maintain the first region at a first temperature or first temperature range, wherein the first temperature or first temperature range is different than a second temperature or second temperature range of the second region.

In some embodiments, the first region comprises a first part and a second part, wherein the fluid flow unit is configured to maintain the first part at a first local atmosphere and maintain the second part at a second local atmosphere different than the first local atmosphere. In some embodiments, the fluid flow unit is configured to maintain the first local atmosphere at a first local temperature or first local temperature range that is different than a second local temperature or second local temperature range of the second local atmosphere. In some embodiments, the fluid flow unit is configured to maintain the first local atmosphere at a first local humidity or first local humidity range that is different than a second local humidity or second local humidity range of the second local atmosphere.

In some embodiments, the detection unit is at least partially contained in the first region. In some embodiments, the detection unit is an optical detection unit. In some embodiments, a first portion of the detection unit is in the first region and a second portion of the detection unit is in the second region. In some embodiments, the first portion of the detection unit comprises an optical imaging objective that is configured to be at least partially immersed in an immersion fluid in contact with the substrate in the first region. In some embodiments, the detection unit is configured to undergo motion while the substrate is stationary. In some embodiments, the substrate is configured to undergo motion while the detection unit is stationary. In some embodiments, the relative motion comprises one or more members selected from the group consisting of (i) substantially linear motion and (ii) substantially non-linear motion. In some embodiments, the detection unit is configured to be fixed relative to the lid. In some embodiments, the substrate is configured to be rotatable relative to the chamber.

In some embodiments, the detection unit comprises one or more optics.

In some embodiments, the detection unit comprises a sensor configured to capture a signal from the analyte.

In some embodiments, the chamber is not in mechanical contact with the lid.

In some embodiments, the lid is configured to move relative to the chamber, or vice versa.

In some embodiments, the fluid flow unit is configured to maintain the first region at the first atmosphere while the detection unit and the substrate are undergoing motion relative to one another.

In some embodiments, the fluid flow unit is configured to generate negative pressure in the location disposed between the chamber and the lid.

In some embodiments, a first portion of the lid is provided between the first region and the second region, and wherein a second portion of the lid is provided between the second region and a third region, wherein a second fluid flow unit is configured to provide fluid in bulk motion to maintain the third region at a third atmosphere that is independent of the first atmosphere and the second atmosphere, and wherein the third region is movable relative to the lid independent of the first region.

In some embodiments, the second atmosphere is a room atmosphere or an ambient atmosphere.

In some embodiments, the system further comprises a controller operatively coupled to the fluid flow unit, wherein the controller is configured to direct the fluid flow unit to cause the fluid to undergo the bulk motion.

In another aspect, provided is a system, comprising: an imaging objective configured to detect a signal or signal change from an analyte coupled to a substrate; an enclosure configured to contain a volume of fluid between the imaging objective and the substrate; a fluid source configured to comprise an aqueous solution; and a fluid flow unit configured to deliver the volume of fluid to the enclosure from the fluid source.

In some embodiments, wherein the aqueous solution comprises a wash solution.

In some embodiments, the aqueous solution comprises an immersion buffer solution comprises a salt, a surfactant, and a buffer.

In some embodiments, the aqueous solution has a pH between 8.0 and 9.0.

In some embodiments, the system further comprises the substrate. In some embodiments, the substrate comprises a fluid layer comprising a second aqueous solution. In some embodiments, the aqueous solution and the second aqueous solution comprise different compositions. In some embodiments, the aqueous solution and the second aqueous solution comprise a same composition.

In another aspect, provided is a method, comprising: (a) bringing an imaging objective in fluid contact with a substrate through a volume of fluid, wherein the fluid comprises a first aqueous solution, wherein the substrate comprises (i) an analyte immobilized adjacent thereto, and (ii) a layer of fluid adjacent thereto, wherein the layer of fluid comprises a second aqueous solution; and (b) imaging the analyte, by the imaging objective, through the volume of fluid.

In some embodiments, the method further comprises moving the imaging objective with respect to the substrate while maintaining fluid contact between the imaging objective and the substrate.

In some embodiments, the method further comprises moving the substrate with respect to the imaging objective while maintaining fluid contact between the imaging objective and the substrate.

In some embodiments, the volume of fluid has a thickness of between about 200 micrometers ($\mu$m) and 500 $\mu$m.

In some embodiments, the layer of fluid has a thickness of between about 5 $\mu$m and 50 $\mu$m.

In some embodiments, the method further comprises (i) breaking fluid contact between the imaging objective and the substrate, and (ii) bringing the imaging objective and the substrate into second fluid contact. In some embodiments, subsequent to (i), at least a portion of the volume of fluid remains in fluid contact with the imaging objective. In some embodiments, subsequent to (i), at least a portion of the volume of fluid remains in fluid contact with the substrate.

In some embodiments, the first aqueous solution comprises a wash solution.

In some embodiments, the first aqueous solution comprises an immersion buffer solution comprises a salt, a surfactant, and a buffer.

In some embodiments, the first aqueous solution has a pH between 8.0 and 9.0.

In some embodiments, the first aqueous solution and the second aqueous solution comprise different compositions.

In some embodiments, the first aqueous solution and the second aqueous solution comprise a same composition.

In another aspect, provided is a method, comprising: (a) bringing an imaging objective in fluid contact with an analyte immobilized adjacent to a substrate through a volume of fluid, wherein the substrate comprises a layer of fluid comprising a second aqueous solution; and (b) imaging the analyte, by the imaging objective, through the volume of fluid.

In some embodiments, the method further comprises moving the imaging objective with respect to the analyte while maintaining fluid contact between the imaging objective and the analyte.

In some embodiments, the method further comprises moving the analyte with respect to the imaging objective while maintaining fluid contact between the imaging objective and the analyte.

In some embodiments, the volume of fluid has a thickness of between about 200 $\mu$m and 500 $\mu$m.

In some embodiments, the layer of fluid has a thickness of between about 5 $\mu$m and 50 $\mu$m.

In some embodiments, the method further comprises (i) breaking fluid contact between the imaging objective and the analyte, and (ii) bringing the imaging objective and the analyte into second fluid contact. In some embodiments, subsequent to (i), at least a portion of the volume of fluid remains in fluid contact with the imaging objective. In some embodiments, subsequent to (i), at least a portion of the volume of fluid remains in fluid contact with the analyte.

In some embodiments, the first aqueous solution comprises a wash solution.

In some embodiments, the first aqueous solution comprises an immersion buffer solution comprises a salt, a surfactant, and a buffer.

In some embodiments, the first aqueous solution has a pH between 8.0 and 9.0.

In some embodiments, the first aqueous solution and the second aqueous solution comprise different compositions.

In some embodiments, the first aqueous solution and the second aqueous solution comprise a same composition.

In another aspect, provided is a system for processing or analyzing an analyte, comprising: a chamber and a lid, wherein the chamber comprises an internal region and is configured to comprise a substrate configured to immobilize the analyte adjacent thereto, wherein the lid is configured to be disposed adjacent to the chamber; and an environmental unit configured to maintain a first local environment, a second local environment, and a third local environment within the internal region, wherein the environmental unit is configured to maintain (i) the first local environment at a first temperature or temperature range, (ii) the second local environment at a second temperature or temperature range, and (iii) the third local environment at a third temperature or temperature range, wherein the first local environment is disposed above the second local environment and the third local environment, and wherein the first local environment is at or in proximity to the lid, and wherein the second local environment is disposed at or near a surface of the substrate, wherein the third local environment is disposed below the first local environment and the second local environment, and wherein the first temperature or temperature range is higher than the second temperature or temperature range and the third temperature or temperature range, and wherein the second temperature or temperature range is lower than the third temperature or temperature range.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein) of which:

DETAILED DESCRIPTION

Figure 1B:
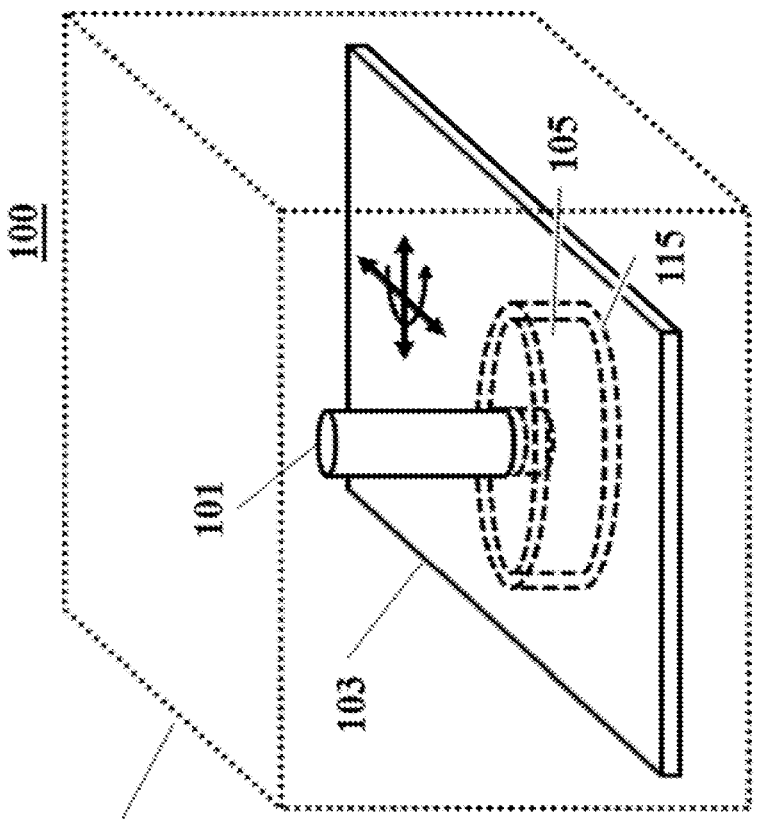
FIG. 1B illustrates a perspective view of FIG. 1A.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Provided herein are barriers that can be implemented between a controlled sample environment and an external environment. A barrier may comprise a transition region between the sample environment and the external environment. The barrier may comprise a fluid barrier. The barrier may comprise fluids from the sample environment, the external environment, or both. The barrier may be a low pressure region. The low pressure region may have lower pressure than the sample environment, the external environment, or both. The barrier may comprise a partial vacuum. The barrier may further comprise a physical barrier.

Beneficially, such barriers may allow for zero friction, or low friction, relative motion between the detector and the sample while maintaining the controlled sample environment. The barriers may allow for continuous scanning involving relative motion in a non-linear direction (e.g., in an R, θ coordinate system) and/or linear direction (e.g., in an X, Y, and/or Z coordinate system). The barriers may allow for continuous scanning in a 100% or substantially 100% relative humidity environment. The barriers may prevent humidity from escaping the sample environment, which when escaped can condense and affect (e.g., corrode, foul, etc.) sensitive equipment, such as the optics. Furthermore, the barriers may prevent contaminants from the external environment from entering the sample environment, which may affect the fluidics and/or detection (e.g., imaging).

The term "fluid," as used herein, generally refers to a gas or liquid, or a mixture thereof. The fluid may comprise solid particles, liquid particles (e.g., water droplet), gas particles (e.g., inert gas atoms or non-inert gas molecules), or a mixture thereof. The fluid may comprise vapor. The fluid may comprise moisture content. The fluid may comprise air, such as ambient air, indoor air, atmospheric air, and/or pressurized air. The fluid may comprise a concentrated element or compound in isolation or in a mixture, for example at a concentration of at least about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, or 100% in the mixture. Alternatively or in addition to, fluid may comprise a concentrated element or compound at a concentration of at most about 100%, 99.9%, 99.8%. 99.7%, 99.6%, 99.5%, 99.4%, 99.3%, 99.2%, 99.1%, 99%, 98%, 97%, 96%, 95%, 94%, 93%, 92%, 91%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, 1% or less in the mixture. Fluid may comprise a suspension or mixture of any particles in a gaseous medium. Fluid may comprise a suspension or mixture of any particles in a liquid medium. Fluid may comprise mist, fog, steam, or aerosol. In some instances, fluid may comprise plasmas. A volume of fluid may be capable of flowing, such as in random motion, coherent motion, and/or bulk motion. A volume of fluid may have a net average motion oriented along one or more directions, or towards a reference destination. In some instances, a volume of fluid in coherent motion or bulk motion may have stream lines that are oriented along the same general direction. A volume of fluid in coherent motion or bulk motion may be differentiated from fluid in random motion (e.g., not in coherent motion, not in bulk motion, not having net average motion). A volume of fluid may have turbulent flow and/or laminar flow.

The term "sample," as used herein, generally refers to a biological sample. The systems, devices, and methods provided herein may be particularly beneficial for analyzing biological samples, which can be highly sensitive to the environment, such as to the temperature, pressure, and/or humidity of the environment. Biological samples may be derived from any subject or living organism. For example, a subject may be an animal, a mammal, an avian, a vertebrate, a rodent (e.g., a mouse), a primate, a simian, a human, or other organism, such as a plant. Animals may include, but are not limited to, farm animals, sport animals, and pets. A subject can be a healthy or asymptomatic individual, an individual that has or is suspected of having a disease (e.g., cancer) or a pre-disposition to the disease, and/or an individual that is in need of therapy or suspected of needing therapy. A subject can be a patient. A subject can be a microorganism or microbe (e.g., bacteria, fungi, archaea, viruses).

A biological sample may comprise any number of macromolecules, for example, cellular macromolecules. The biological sample may be a cell sample. The biological sample may be a cell line or cell culture sample. The biological sample can include one or more cells. The biological sample can include one or more microbes. The biological sample may be a nucleic acid sample or protein sample. The biological sample may also be a carbohydrate sample or a lipid sample. The biological sample may be derived from another sample. The sample may be a tissue sample, such as a biopsy, core biopsy, needle aspirate, or fine needle aspirate. The sample may be a fluid sample, such as a blood sample, urine sample, or saliva sample. The sample may be a skin sample. The sample may be a cheek swab. The sample may be a plasma or serum sample. The sample may be a cell-free or cell free sample. A cell-free sample may include extracellular polynucleotides. Extracellular polynucleotides may be isolated from a bodily sample that may be selected from the group consisting of blood, plasma, serum, urine, saliva, mucosal excretions, sputum, stool and tears.

A biological sample may comprise one or more biological particles. The biological particle may be a macromolecule. The biological particle may be a small molecule. The biological particle may be a virus. The biological particle may be a cell or derivative of a cell. The biological particle may be an organelle. The biological particle may be a rare cell from a population of cells. The biological particle may be any type of cell, including without limitation prokaryotic cells, eukaryotic cells, bacterial, fungal, plant, mammalian, or other animal cell type, mycoplasmas, normal tissue cells, tumor cells, or any other cell type, whether derived from single cell or multicellular organisms. The biological particle may be a constituent (e.g., macromolecular constituent) of a cell, such as deoxyribonucleic acids (DNA), ribonucleic acids (RNA), nucleus, organelles, proteins, peptides, polypeptides, or any combination thereof. The RNA may be coding or non-coding. The RNA may be messenger RNA (mRNA), ribosomal RNA (rRNA) or transfer RNA (tRNA), for example. The RNA may be a transcript. The RNA may be small RNA that are less than 200 nucleic acid bases in length, or large RNA that are greater than 200 nucleic acid bases in length. Small RNAs may include 5.8S ribosomal RNA (rRNA), 5S rRNA, transfer RNA (tRNA), microRNA (miRNA), small interfering RNA (siRNA), small nucleolar RNA (snoRNAs), Piwi-interacting RNA (piRNA), tRNA-derived small RNA (tsRNA) and small rDNA-derived RNA (srRNA). The RNA may be double-stranded RNA or single-stranded RNA. The RNA may be circular RNA. The biological particle may be a hardened cell. Such hardened cell may or may not include a cell wall or cell membrane. Alternatively or in addition to, samples of the present disclosure may include non-biological samples.

The term "analyte," as used herein, generally refers to an object that is analyzed, one or more properties measured determined, or otherwise assayed. An analyte may be a biological analyte, that is, or derived from, a biological sample for example. An analyte may be a non-biological analyte, that is, or derived from, a non-biological sample for example.

The terms "motion relative to," or similar variations ("movable relative to," "moving relative to,"), as used herein with reference to a relationship between a first object and a second object (e.g., motion of a first object relative to a second object), generally refer to motion by the first object, motion by the second object, or both, relative to the other.

The term "detector," as used herein may refer to any device or assembly of devices configured to detect a signal. The detector may comprise an objective. The detector may comprise a plurality of objectives. The detector may comprise an imaging system.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Fluid Barriers

Provided herein are methods for processing and/or detecting a sample. In some instances, the methods can comprise providing a barrier between a first region (e.g., sample containing region) and a second region (e.g., external region). The barrier may maintain the first region at a first atmosphere that is different than a second atmosphere of the second region. A portion of the barrier may comprise fluid in coherent motion or bulk motion. The first region can comprise the sample. Then a detector at least partially contained in the first region can detect one or more signals from the sample while the first region is maintained at the first atmosphere that is different than the second atmosphere of the second region. The detector may not be in direct mechanical contact with a substrate contained in the first region. The substrate may comprise the sample thereon. The detector may be in fluidic (or fluid) contact with the substrate (e.g., the detector may not be in direct mechanical contact with the substrate, but may be coupled to the substrate through a fluid). The detector may be in liquid contact with the substrate. The detector may be in gaseous contact with the substrate.

In some instances, the methods can comprise providing a barrier between a first region (e.g., sample containing region) and a second region (e.g., external region), wherein the barrier maintains the first region at a first atmosphere that is different than a second atmosphere of the second region. The first region can comprise the sample. Then a detector at least partially contained in the first region can detect one or more signals from the sample while (i) the detector is undergoing a detection event, such as when (1) the detector is undergoing continuous low friction or zero friction motion relative to the first region, (2) the detector is undergoing discrete motions relative to the first region at different time intervals (e.g., in a discontinuous manner), and (ii) the first region is maintained at the first atmosphere that is different than the second atmosphere of the second region. The detection event may comprise imaging or scanning during relative motion between the detector and the sample. The detection event may comprise imaging or scanning while the detector and the sample are stationary relative to each other. The detector may not be in direct mechanical contact with a substrate contained in the first region, wherein the substrate comprises the sample thereon. The detector may be in fluidic contact with the substrate. The detector may be in liquid contact with the substrate. The detector may be in gaseous contact with the substrate.

Provided herein are systems for processing and/or detecting a sample. In some instances, the systems can comprise a barrier disposed between a first region (e.g., sample-containing region) and a second region (e.g., external region). The first region may be configured to contain the sample. The barrier may be configured to maintain the first region at a first atmosphere that is different than a second atmosphere of the second region. A portion of the barrier may comprise a fluid in coherent motion or bulk motion. The system can comprise a detector at least partially contained in the first region. The detector may be configured to detect one or more signals from the sample while the first region is maintained at the first atmosphere that is different than the second atmosphere of the second region. In some instances, the detector can be configured to detect one or more signals from the sample while the detector is undergoing a detection event. For example, the detection event may comprise continuous low friction or zero friction motion of the detector relative to the first region. For example, the detection event may comprise discrete motions of the detector relative to the first region at different time intervals (e.g., in a discontinuous manner). The detection event may comprise imaging or scanning during relative motion between the detector and the sample. The detection event may comprise imaging or scanning while the detector and the sample are stationary relative to each other. In some instances, the first region may comprise a substrate comprising the sample thereon. For example, the sample may be immobilized adjacent to the substrate. In some instances, the detector may not be in direct mechanical contact with the substrate. In some instances, the detector may be in fluidic contact with the substrate. The detector may be in liquid contact with the substrate. The detector may be in gaseous contact with the substrate.

Figure 1A:
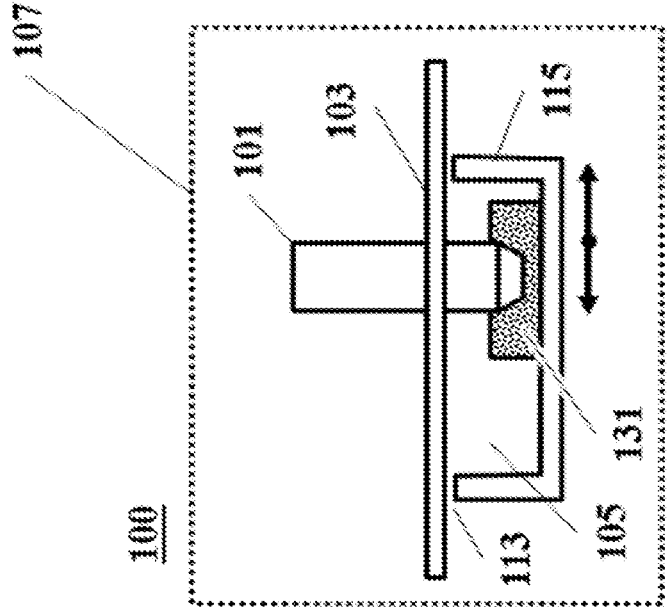
FIG. 1A illustrate a cross-sectional side view of an example barrier system.

FIGS. 1A and 1B illustrate an example barrier system 100, showing a cross-sectional side view and a perspective view, respectively. A fluid barrier 113 may be implemented between a sample environment 105 (e.g., first region) and an external environment 107 (e.g., second region). The sample environment 105 may be a controlled environment, comprising one or more samples therein. The external environment 107 may be a closed or open environment. In some instances, the external environment 107 may be a room environment or ambient environment. In some instances, the external environment 107 may also be a controlled environment.

The sample environment 105 region may be defined by a chamber 115, a plate 103, and the fluid barrier 113. The fluid barrier 113 may be maintained between a physical gap between the chamber 115 and the plate 103. The term "plate," as used herein, may be interchangeably referred to herein as a lid. In some instances, the physical gap may be large enough to allow fluid communication between the sample environment 105 and the external environment 107 when the fluid barrier 113 is otherwise not in place. The chamber 115 and the plate 103 may be independent such that the chamber 115, and the sample environment 105 region defined thereby, is movable relative to the plate 103. For example, the sample environment 105 region may be defined by different parts of the plate 103 with different locations of the chamber 115 relative to the plate 103. The relative motion between the chamber 115 and the plate 103 can be in any direction, such as in a non-linear direction (e.g., in an R, θ coordinate system) and/or linear direction (e.g., in an X, Y, and/or Z coordinate system). For example, the relative motion may be rotational about a central axis, or linear along any linear axis. In some instances, actuator units (e.g., linear stages, motors, etc.) and/or structural units (e.g., beams, supports, tracks, etc.) may constrain the relative motion between the chamber 115 and the plate 103.

The plate 103 and the chamber 115 may not be in direct mechanical contact, such that there is a minimal distance between the plate and the chamber. A minimal distance between the plate 103 and the chamber 115 may be at least about 100 micrometers (μm), 150 μm, 200 μm, 250 μm, 300

μm, 350 μm, 400 μm, 450 μm, 500 μm, 550 μm, 600 μm, 650 μm, 700 μm, 750 μm, 800 μm, 850 μm, 900 μm, 950 μm, 1 millimeter (mm), 2 mm, 3 mm, 4 mm, 5 mm, 6 mm, 7 mm, 8 mm, 9 mm, 1 centimeter (cm), or more. Alternatively or in addition to, the minimal distance may be at most about 1 cm, 9 mm, 8 mm, 7 mm, 6 mm, 5 mm, 4 mm, 3 mm, 2 mm, 1 mm, 950 μm, 900 μm, 850 μm, 800 μm, 750 μm, 700 μm, 650 μm, 600 μm, 550 μm, 500 μm, 450 μm, 400 μm, 350 μm, 300 μm, 250 μm, 200 μm, 150 μm, 100 μm, or less. Alternatively or in addition to, the minimal distance may be within a range defined by any two of the preceding values.

The fluid barrier 113 may act as a transition region between the sample environment 105 and the external environment 107. The fluid barrier 113 may comprise fluids (e.g., air) from the sample environment, the external environment, or both. The fluid barrier 113 may be a low pressure region. The fluid barrier 113 may have lower pressure than the sample environment, the external environment, or both. The barrier may comprise a partial vacuum. The barrier may comprise fluid volume(s) subject to negative pressure. In some instances, the fluid barrier 113 may be a high pressure region. For example, the fluid barrier may have a higher pressure than the sample environment, the external environment, or both. The fluid barrier 113 may be in coherent motion, such as in a coherent direction of flow. The fluid barrier 113 may be in bulk motion. The fluid barrier may comprise volumes of fluid that has a net average motion oriented along one or more directions, or towards a reference destination. In some instances, a volume of fluid in coherent motion or bulk motion may have stream lines that are oriented along the same general direction. Fluid in coherent motion or bulk motion may be differentiated from fluid in random motion that are not part of the fluid barrier (e.g., not in coherent motion, not in bulk motion, not having net average motion). Fluid in the fluid barrier may have turbulent flow and/or laminar flow.

The sample environment 105 may comprise a substrate. One or more samples may be immobilized on or adjacent to the substrate. Alternatively or in addition to, the one or more samples may otherwise be disposed on the substrate. In some instances, at least a part of the chamber 115 may be or comprise a substrate. In other instances, the chamber 115 may be coupled to a substrate. In some instances, the substrate may be fixed relative to the chamber 115. Alternatively, the substrate may be movable relative to the chamber 115, for example, in a linear and/or non-linear (e.g., rotational) direction. For example, the substrate may be fixed in XY coordinates (and/or Z coordinates) to the chamber 115, but rotatable relative to the chamber 115. Where both the chamber 115 is movable relative to the plate 103 and the substrate is movable relative to the chamber 115, the two relative motions may or may not be operated by the same actuator units.

A detector 101 may protrude into the sample environment 105 from the external environment 107 through the plate 103, such as through an aperture in the plate 103. The fit between the detector 101 and the aperture may be fluid-tight such that there is no fluid communication through the aperture when the detector 101 is fitted through the aperture. Alternatively or in addition to, the aperture may be hermetically sealed. Alternatively, the plate 103 may be integral to the detector 101. Alternatively, the detector 101 may be entirely contained in the sample environment 105, for example, by affixing a non-sample facing end to the plate 103.

At least a portion of the detector 101 may be fixed relative to the plate 103. In some instances, the detector 101 may be capable of translating along an axis that is substantially normal to the plane of the plate 103 (e.g., through the aperture) independent of the plate 103. In some instances, at least a portion of the detector 101 (e.g., a portion of the detector inside the sample environment region) may be capable of moving (e.g., linearly or nonlinearly, such as rotating) independent of the plate 103.

Within the sample environment 105, the detector 101 may be configured to detect the one or more samples disposed on the substrate using an immersion optical system. A portion of the detector inside the sample environment 105, such as an optical imaging objective, may be in optical communication with the substrate through a liquid fluid 131 medium. In some instances, the liquid fluid medium may be disposed on a local region of the substrate. In other instances, the liquid fluid medium may be disposed across an entire area of a surface of the substrate (e.g., across a base of chamber 115). Alternatively, the detector may be in optical communication with the substrate without the liquid fluid medium.

Figure 1C:
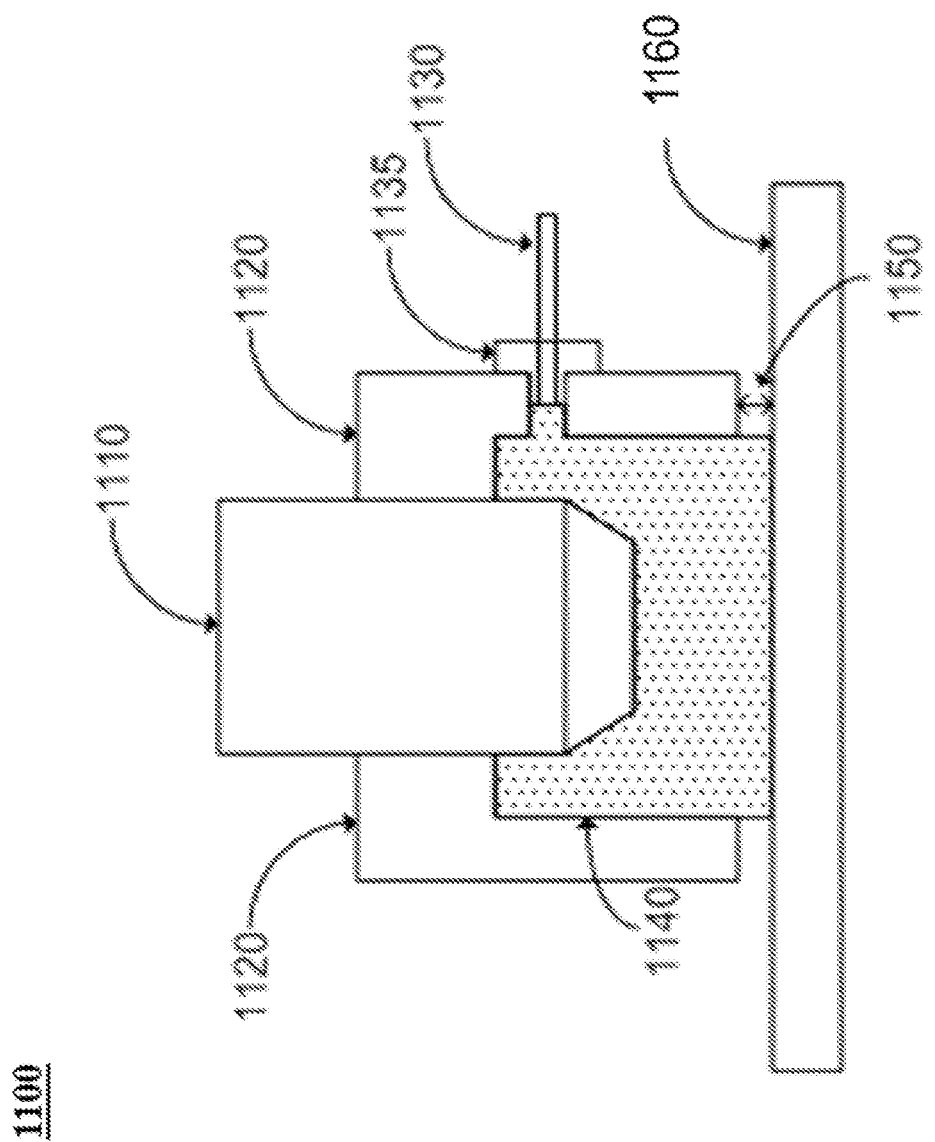
FIG. 1C illustrates a cross-sectional view of an example immersion optical system.

FIG. 1C illustrates a cross-sectional view of an example immersion optical system 1100. The system 1100 may be used to optically image the substrates described herein. The system 1100 may be integrated with any barrier system described elsewhere herein. The system may comprise an optical imaging objective 1110 (e.g., detector 101). For example, the objective may have protruded into the sample environment (e.g., through plate 103) or may be contained within the sample environment (e.g., and affixed to a surface of the plate 103). The optical imaging objective may be an immersion optical imaging objective. The optical imaging objective may be configured to be in optical communication with a substrate 1160. The optical imaging objective may be partially or completely surrounded by an enclosure 1120. The enclosure may partially or completely surround a sample-facing end of the optical imaging objective. The enclosure may be fixed to the optical imaging objective and/or to the plate. The enclosure may have a generally cup-like shape or form. The enclosure may be any container. The enclosure may be configured to contain a fluid 1140 (such as water or an aqueous solution or oil or an organic solution) in which the optical imaging objective is to be immersed. The fluid may be in contact with the substrate 1160. Thus, the objective and the substrate may be in fluidic contact, such as liquid contact.

In some cases, as the objective 1110 and the substrate 1160 undergoes relative motion in a substantially X-Y plane, (e.g., linear motion, non-linear motion, rotational motion, etc.), the objective and the substrate may remain in fluidic contact (e.g., liquid contact) through the fluid 1140.

In some cases, as the objective 1110 and the substrate 1160 undergoes relative motion along a Z axis or another axis (having a Z component), such as when the objective is brought out of fluidic contact (e.g., liquid contact) with the substrate, for example between different rounds of scanning, at least a portion of a volume of the fluid 1140 from previous fluidic contact between the objective and the substrate may remain in contact with the objective. In some instances, at least a portion of a volume of the fluid 1140 from previous fluidic contact between the objective and the substrate may remain on the substrate. In some instances, such fluid may become part of an aqueous interface or environment of one or more layers of aqueous solution or mixture disposed adjacent to the substrate. On next fluidic contact between the objective and the substrate, a new volume of fluid may be provided in the enclosure 1120, such as with aid of the fluid flow tube 1130 described elsewhere herein.

The enclosure 1120 may be configured to maintain a minimal distance 1150 between the substrate and the enclosure in order to avoid contact between the enclosure and the substrate 1160 during movement of the substrate relative to the plate. The minimal distance may be at least about 100 nanometers (nm), at 200 nm, 300 nm, 400 nm, 500 nm, 1 micrometer (μm), 2 μm, 3 μm, 4 μm, 5 μm, 10 μm, 20 μm, 30 μm, 40 μm, 50 μm, 100 μm, 200 μm, 300 μm, 400 μm, 500 μm, 1 millimeter (mm) or more. Alternatively or in addition to, the minimal distance may be at most about 1 mm, 500 μm, 400 μm, 300 μm, 200 μm, 100 μm, 50 μm, 40 μm, 30 μm, 20 μm, 10 μm, 5 μm, 4 μm, 3 μm, 2 μm, 1 μm, 500 nm, 400 nm, 300 nm, 200 nm, 100 nm or less. Alternatively or in addition to, the minimal distance may be within a range defined by any two of the preceding values. Even with a minimal distance, the enclosure may contain the fluid due to surface tension effects. The system may comprise a fluid flow tube 1130 configured to deliver fluid 1140 to the inside of the enclosure. The volume of fluid 1140 in the enclosure may be continuously or intermittently replenished and/or washed during detection events via the fluid flow tube. Beneficially, any contaminants in the fluid volume may be washed out during such replenishing and/or washing. For example, in some cases, the volume of fluid may be continuously replenished. During replenishing, a new volume of fluid may be directed to the enclosure and at least a part of the existing volume of fluid in the enclosure may wet onto the surface of the substrate, and in some cases, off an edge of the surface of the substrate. The existing volume of fluid may become part of an aqueous interface or fluid layer of the substrate. The fluid flow tube may be connected to the enclosure through an adaptor 1135. The adaptor may comprise a threaded adaptor, a compression adaptor, or any other adaptor.

An electrical field application unit (not shown) can be configured to regulate a hydrophobicity of one or more surfaces of a container to retain at least a portion of the fluid contacting the immersion objective lens and the open substrate, such as by applying an electrical field.

The fluid 1140 may comprise a water or an aqueous solution. The fluid may comprise an oil or an organic solution. The fluid may comprise a mixture of aqueous and non-aqueous solutions. In cases where the fluid comprises water or aqueous solution(s), advantageously, such fluid may be especially compatible with maintaining continuity of an aqueous interface or environment adjacent to the substrate 1160 and facilitating interaction between the objective and the substrate. For example, the substrate 1160 may comprise one or more layers of aqueous solution or mixture adjacent thereto, such as for chemical processing operations and/or maintenance of the analyte or sample disposed on the substrate. The volume(s) of fluid 1140 brought into contact with, and/or moved relative to, the one or more layers of aqueous solution or mixture adjacent to the substrate may not disrupt, or minimize or mitigate disruption to, such one or more layers of aqueous solution or mixture adjacent to the substrate. For example, if the volume of fluid 1140 is immiscible with the composition of the one or more layers adjacent to the substrate, the optical path from the objective to the sample on the substrate may be disrupted, the relative motion between the objective and the substrate may be disrupted, the aqueous interface or environment adjacent to the substrate may be disrupted, undesired residue may be generated or left behind in the one or more layers adjacent to the substrate or the fluid volume, or both, and/or any combination of the above may occur. In some instances, the fluid and the one or more layers of aqueous solution or mixture may comprise the same aqueous solution or mixture. In some instances, the fluid and the one or more layers of aqueous solution or mixture may comprise different aqueous solutions or mixtures.

In some examples, the fluid 1140 comprises an immersion buffer solution. The immersion buffer solution may have the same composition as a washing solution used during a chemical operation. The immersion buffer solution and/or washing solution can comprise a composition of a buffer, a salt, and a surfactant. The buffer solution may have a pH between about 8.0 and 9.0. In some instances, the fluid may have a pH of at least about 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5 or greater. Alternatively or in addition to, the fluid may have a pH of at most about 9.5, 9.4, 9.3, 9.2, 9.1, 9.0, 8.9, 8.8, 8.7, 8.6, 8.5, 8.4, 8.3, 8.2, 8.1, 8.0, 7.9, 7.8, 7.7, 7.6, 7.5, 7.4, 7.3, 7.2, 7.1, 7.0, 6.9, 6.8, 6.7, 6.6, 6.5 or less. In some examples, an immersion buffer solution comprises 20 millimolar (mM) tris (hydroxymethyl)aminomethane, 110 mM NaCl and 0.1% Triton-X100.

In some cases, the optical imaging objective 1110 and enclosure 1120 may provide a physical barrier between a first location on the substrate in which chemical processing operations are performed and a second location on the substrate in which detection operations are performed. In this manner, the chemical processing operations and the detection operations may be performed with independent operation conditions and contamination of the detector may be avoided. The first and second locations may have different humidities, temperatures, pressures, or atmospheric admixtures.

A method of detection of one or more signals, or change thereof, from an analyte may comprise using the immersion optical system. The method may comprise bringing the optical imaging objective 1110 in fluidic contact with the substrate 1160, comprising the analyte disposed thereon, by providing fluid 1140 in the enclosure 1120 between the objective and the substrate. The fluid may be continuously or intermittently replenished or washed using the fluid flow tube 1130. The method may further comprise, prior to bringing the objective in fluidic contact with the substrate, washing a surface of the substrate. The method may further comprise, prior to washing the surface of the substrate, bringing a reaction mixture in contact with the surface of the substrate to perform one or more chemical processing operations. The washing operation may prevent contamination between the one or more chemical processing operations (e.g., by the reaction mixture) and the detection operations. For example, such washing operation may prevent carryover of nucleotides or other reagents from a chemical processing operation into an imaging or scanning operation.

The method may further comprise removing the fluidic contact between the objective and the substrate, such as by lifting the objective relative to the substrate and/or depressing the substrate relative to the objective.

The method further comprises repeating a detection operation (e.g., bringing the optical imaging objective in fluidic contact with the substrate and removing fluidic contact) on the same substrate multiple times. For example, the detection operation may be repeated on the same substrate at least 2 times, 3 times, 4 times, 5 times, 6 times, 7 times, 8 times, 9 times, 10 times, 20 times, 30 times, 40 times, 50 times, 60 times, 70 times, 80 times, 90 times, 100 times or more.

The fluid 1140 may comprise water or aqueous solutions or mixtures. The fluid may comprise oil, non-aqueous solutions, and/or organic solutions or mixtures. The substrate may comprise one or more layers of aqueous solutions or mixtures adjacent thereto. The substrate may comprise one or more layers of oil, non-aqueous, and/or organic solutions or mixtures adjacent thereto. The fluid 1140 and the one or more layers of solutions or mixtures adjacent thereto may comprise respectively miscible compositions.

Systems and methods for detection may comprise an immersion objective system as described herein.

A system may comprise an imaging objective configured to detect a signal or signal change form an analyte coupled to a substrate, an enclosure configured to contain a volume of fluid between the imaging objective and the substrate, a fluid source comprising an aqueous solution, and a fluid flow unit configured to deliver the volume of fluid to the enclosure from the fluid source. The enclosure may be a physical enclosure. The aqueous solution may comprise an immersion buffer solution. The substrate may comprise one or more fluid layers. The one or more fluid layers can comprise a second aqueous solution. The second aqueous solution and the aqueous solution may comprise different compositions (e.g., different salt or concentration thereof, different surfactant or concentration thereof, different buffer or concentration thereof, different compound or mixture or concentration thereof). The second aqueous solution and the aqueous solution may comprise the same solution. The analyte and the objective may be in fluid contact through the aqueous solution and the second aqueous solution. The system can further comprise the substrate. The substrate can be any substrate as described elsewhere herein.

Provided is a method comprising bringing an imaging objective in fluid contact with a substrate through a volume of fluid. The volume of fluid may comprise a first aqueous solution. The substrate may comprise (i) an analyte immobilized adjacent thereto, and (ii) a layer of fluid adjacent thereto. The layer of fluid may comprises a second aqueous solution. The method may comprise imaging the analyte, by the imaging objective, through the volume of fluid. The method may further comprise moving the imaging objective with respect to the substrate or the substrate with respect to the imaging objective, or both, while maintaining fluid contact between the imaging objective and the substrate. The method may further comprise (i) breaking fluid contact between the imaging objective and the substrate, and (ii) bringing the imaging objective and the substrate into second fluid contact. Subsequent to breaking fluid contact, at least a portion of the volume of fluid can remain in fluid contact with the imaging objective and/or the substrate.

Provided is a method comprising bringing an imaging objective in fluid contact with an analyte immobilized adjacent to a substrate through a volume of fluid comprising a first aqueous solution. The substrate may comprise a layer of fluid comprising a second volume of fluid. The method may comprise imaging the analyte, by the imaging objective, through the volume of fluid. The method may further comprise moving the imaging objective with respect to the substrate or the substrate with respect to the imaging objective, or both, while maintaining fluid contact between the imaging objective and the substrate. The method may further comprise (i) breaking fluid contact between the imaging objective and the analyte, and (ii) bringing the imaging objective and the analyte into second fluid contact. Subsequent to breaking fluid contact, at least a portion of the volume of fluid can remain in fluid contact with the imaging objective and/or the analyte.

The volume of fluid may have a thickness (e.g., minimum distance between the objective and the substrate and/or analyte) on the order of 10 µm, 100 µm, 1000 µm (or 1 millimeter (mm)), 10 mm, 100 mm or more. In some instances, the thickness of the fluid volume may be at least about 50 µm, 60 µm, 70 µm, 80 µm, 90 µm, 100 µm, 110 µm, 120 µm, 130 µm, 140 µm, 150 µm, 160 µm, 170 µm, 180 µm, 190 µm, 200 µm, 210 µm, 220 µm, 230 µm, 240 µm, 250 µm, 260 µm, 270 µm, 280 µm, 290 µm, 300 µm, 310 µm, 320 µm, 330 µm, 340 µm, 350 µm, 360 µm, 370 µm, 380 µm, 390 µm, 400 µm, 410 µm, 420 µm, 430 µm, 440 µm, 450 µm, 460 µm, 470 µm, 480 µm, 490 µm, 500 µm, 550 µm, 600 µm, 650 µm, 700 µm, 750 µm, 800 µm, 850 µm, 900 µm, 950 µm, 1000 µm or more. Alternatively or in addition to, the thickness of the volume of fluid may have at most about 1000 µm, 950 µm, 900 µm, 850 µm, 800 µm, 750 µm, 700 µm, 650 µm, 600 µm, 550 µm, 500 µm, 490 µm, 480 µm, 470 µm, 460 µm, 450 µm, 440 µm, 430 µm, 420 µm, 410 µm, 400 µm, 390 µm, 380 µm, 370 µm, 360 µm, 350 µm, 340 µm, 330 µm, 320 µm, 310 µm, 300 µm, 290 µm, 280 µm, 270 µm, 260 µm, 250 µm, 240 µm, 230 µm, 220 µm, 210 µm, 200 µm, 190 µm, 180 µm, 170 µm, 160 µm, 150 µm, 140 µm, 130 µm, 120 µm, 110 µm, 100 µm, 90 µm, 80 µm, 70 µm, 60 µm, 50 µm, or less. Alternatively or in addition to, the thickness of the volume of fluid may be between any range of any two of the preceding values. The substrate may comprise one or more fluid layers, each layer having the same or different fluid compositions. A fluid layer may comprise an aqueous solution. A fluid layer may comprise a non-aqueous solution. A fluid layer may be a thin film. In some instances, a thickness of a fluid layer may be at least about 10 nanometers (nm), 20 nm, 30 nm, 40 nm, 50 nm, 60 nm, 70 nm, 80 nm, 90 nm, 100 nm, 150 nm, 200 nm, 250 nm, 300 nm, 350 nm, 400 nm, 450 nm, 500 nm, 600 nm, 700 nm, 800 nm, 900 nm, 1 µm, 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1000 µm or more. Alternatively or in addition to, the thickness of a fluid layer may be at most about 1 mm, 900 µm, 800 µm, 700 µm, 600 µm, 500 µm, 400 µm, 300 µm, 200 µm, 100 µm, 90 µm, 80 µm, 70 µm, 60 µm, 50 µm, 40 µm, 30 µm, 20 µm, 19 µm, 18 µm, 17 µm, 16 µm, 15 µm, 14 µm, 13 µm, 12 µm, 11 µm, 10 µm, 9 µm, 8 µm, 7 µm, 6 µm, 5 µm, 4 µm, 3 µm, 2 µm, 1 µm, 900 mm, 800 mm, 700 mm, 600 mm, 500 nm, 450 nm, 400 nm, 350 nm, 300 nm, 250 nm, 200 nm, 150 nm, 100 nm, 90 nm, 80 nm, 70 nm, 60 nm, 50 nm, 40 nm, 30 nm, 20 nm, 10 nm or less. Alternatively or in addition to, the thickness of the fluid layer may be between any range of any two of the preceding values.

Figure 2A:
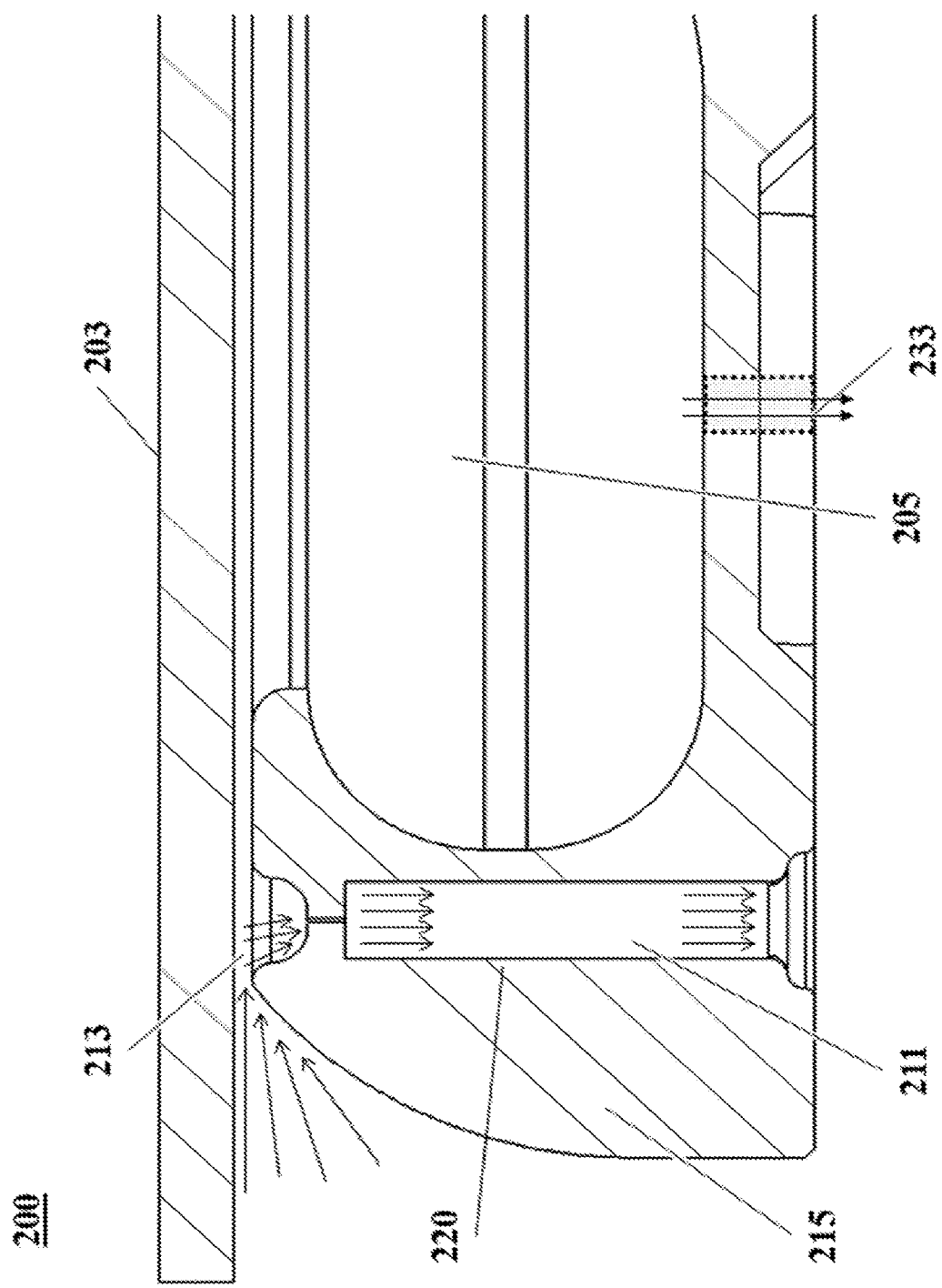
FIG. 2A illustrates a partial cross-sectional view of a barrier system maintaining a fluid barrier.
Figure 2B:
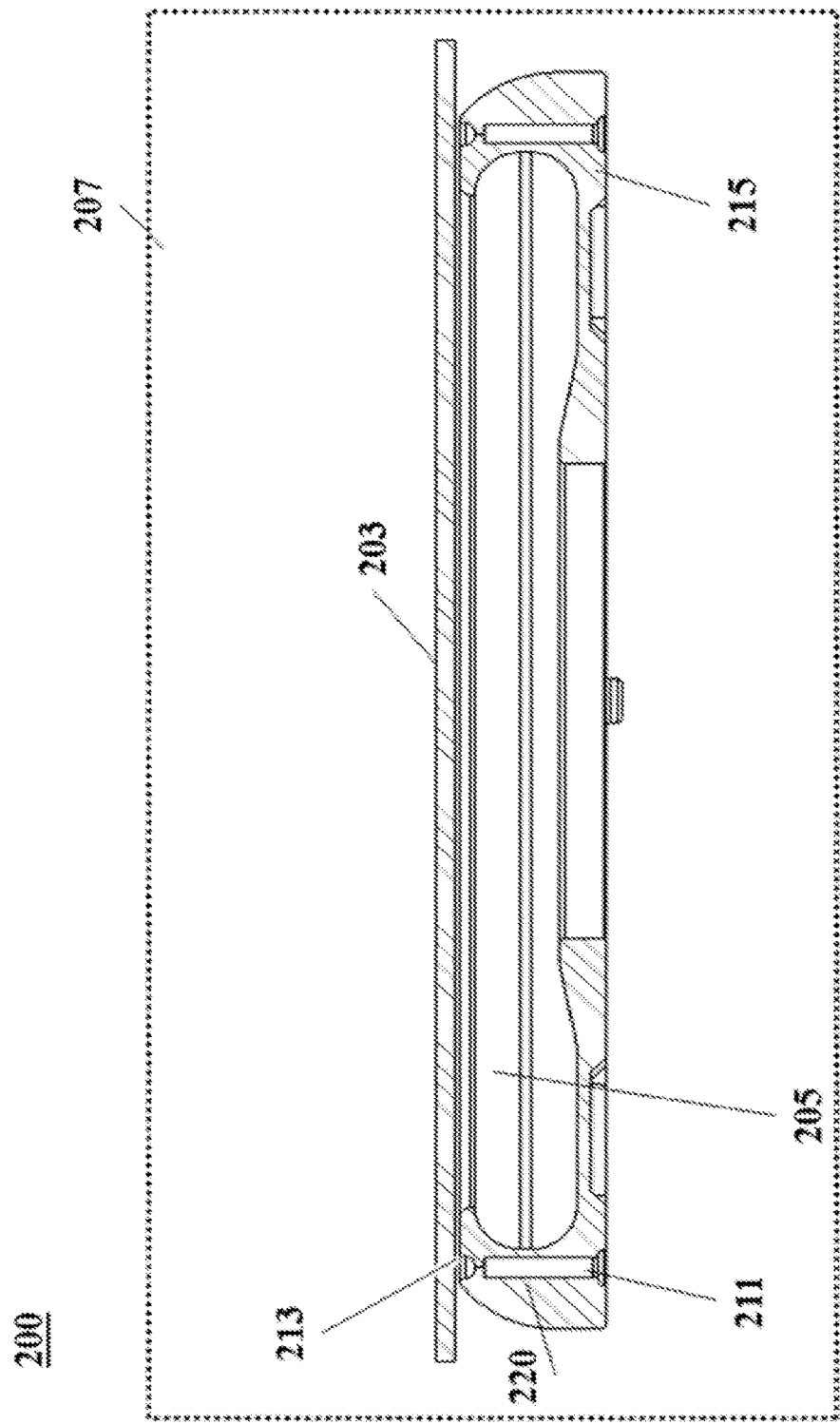
FIG. 2B illustrates a zoomed out view of the barrier system of FIG. 2A.
Figure 2C:
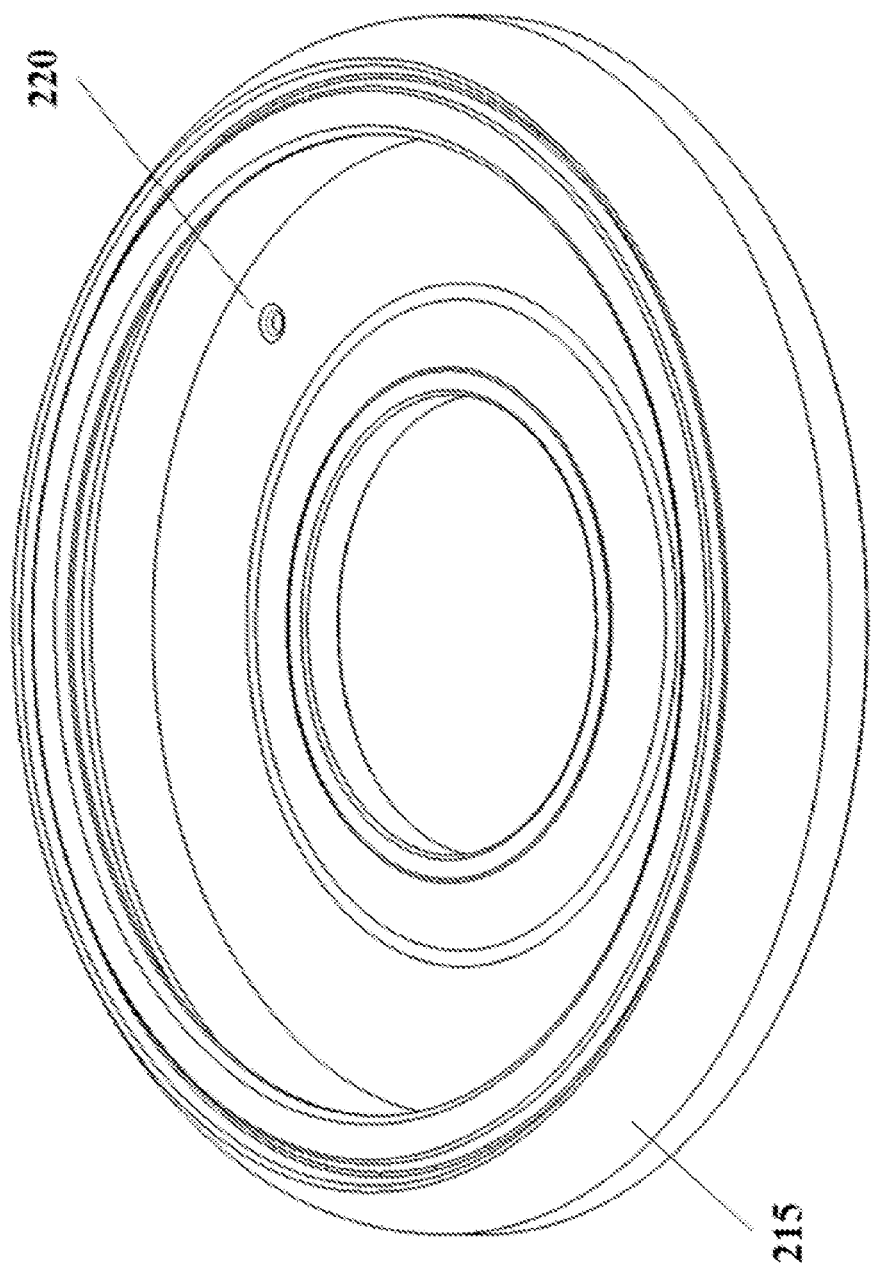
FIG. 2C illustrates a perspective view of a chamber of the barrier system of FIG. 2A.

FIG. 2A illustrates a partial cross-sectional view of a barrier system 200 maintaining a fluid barrier 213. FIG. 2B illustrates a zoomed out view of the barrier system 200. FIG. 2C illustrates a perspective view of a chamber 215 of the barrier system 200. The barrier system 200, and/or respective components thereof, may correspond to the barrier system 100, and/or respective components thereof.

The barrier system 200 comprises a sample environment 205 defined by a plate 203, the chamber 215, and the fluid barrier 213. The chamber 215 and the plate 203 may be separated by a physical gap. The sample environment 205 may be isolated (and/or insulated) from an external environment 207.

The fluid barrier 213 may act as a transition region between the sample environment 205 and the external environment 207. The fluid barrier 213 may comprise fluids (e.g., air) from the sample environment 205, the external environment 207, or both. The fluid barrier 213 may be a low pressure region. The fluid barrier 213 may have lower pressure than the sample environment, the external environment, or both. The fluid barrier 213 may be maintained via a fluid flow unit, such as a pressure-altering apparatus 211. The fluid barrier 213 may comprise fluid in coherent motion or bulk motion.

The pressure-altering apparatus 211 may be integral to the chamber 215. For example, as illustrated in FIGS. 2A-2C, the pressure-altering apparatus may be integrated as a fluid channel 220 in a wall of the chamber 215. For example, suction may be applied through the fluid channel 220 to draw in fluids from the external environment 207, or sample environment 205, or both, to generate a partial vacuum curtain (e.g., in coherent motion, in bulk motion, etc.), thereby creating the fluid barrier 213. Otherwise, the fluid may be subjected to negative pressure. The fluid exhaust may be expelled at another end of the fluid channel. Alternatively or in addition to, the apparatus may not be integral to the chamber 215. The fluid flow unit and/or the pressure-altering apparatus 211 may be operated via one or more compressors (e.g., to generate negative pressure), pumps (e.g., to generate positive pressure), suction apparatus, and/or other devices to provide the lower pressure in the transition region. The chamber 215 may comprise one or more fluid channels 220 for implementing fluid barriers of the present disclosure.

While two pressure-altering apparatus 211 is illustrated in FIGS. 2A-2C, it will be appreciated that there may be any number of such apparatus. For example, there may be at least about 2, 3, 4, 5, 6, 7, 8, 9, 10, 20, 30, 40, 50 or more such apparatus. Alternatively or in addition to, there may be at most about 50, 40, 30, 20, 10, 9, 8, 7, 6, 5, 4, 3, or 2 such apparatus. In some instances, one or more pressure-altering apparatus 211 may be implemented as an annular fluid channel surrounding the sample environment region, or other fluid channel along a perimeter or boundary of the sample environment region. In some instances, one or more additional fluid flow channels (e.g., 233) may be provided near a bottom of the chamber to draw in excess fluid (e.g., liquids, gases) from the sample environment region.

Beneficially, the fluid barrier 213 may provide a low friction or zero friction seal between the sample environment 205 and the external environment 207. In some instances, a fluid flow rate through the fluid barrier 213 may be at least about 5 liters per minute (L/min), 5.5 L/min, 6 L/min, 6.5 L/min, 7 L/min, 7.5 L/min, 8 L/min, 8.5 L/min, 9 L/min, 9.5 L/min, 10 L/min, 10.5 L/min, 11 L, 11.5 L/min, 12 L/min, 12.5 L/min, 13 L/min, 13.5 L/min, 14 L/min, 14.5 L/min, 15 L/min, or more. Alternatively or in addition to, the fluid flow rate may be at most 15 L/min, 14.5 L/min, 14 L/min, 13.5 L/min, 13 L/min, 12.5 L/min, 12 L/min, 11.5 L/min, 11 L/min, 10.5 L/min, 10 L/min, 9.5 L/min, 9 L/min, 8.5 L/min, 8 L/min, 7.5 L/min, 7 L/min, 6.5 L/min, 6 L/min, 5.5 L/min, 5 L/min, or less. As will be appreciated the fluid flow rate may vary with different parameters (e.g., minimal distance between the plate and chamber, pressure, temperature, etc.). In some examples, for a gap of about 500 microns between the plate 203 and the chamber 215, the fluid flow rate can be about 10 L/min or about 13 milliliters per minute (mL/min) per millimeter (mm) along the circumference for a velocity of about 0.42 meters per second (m/s).

Figure 3:
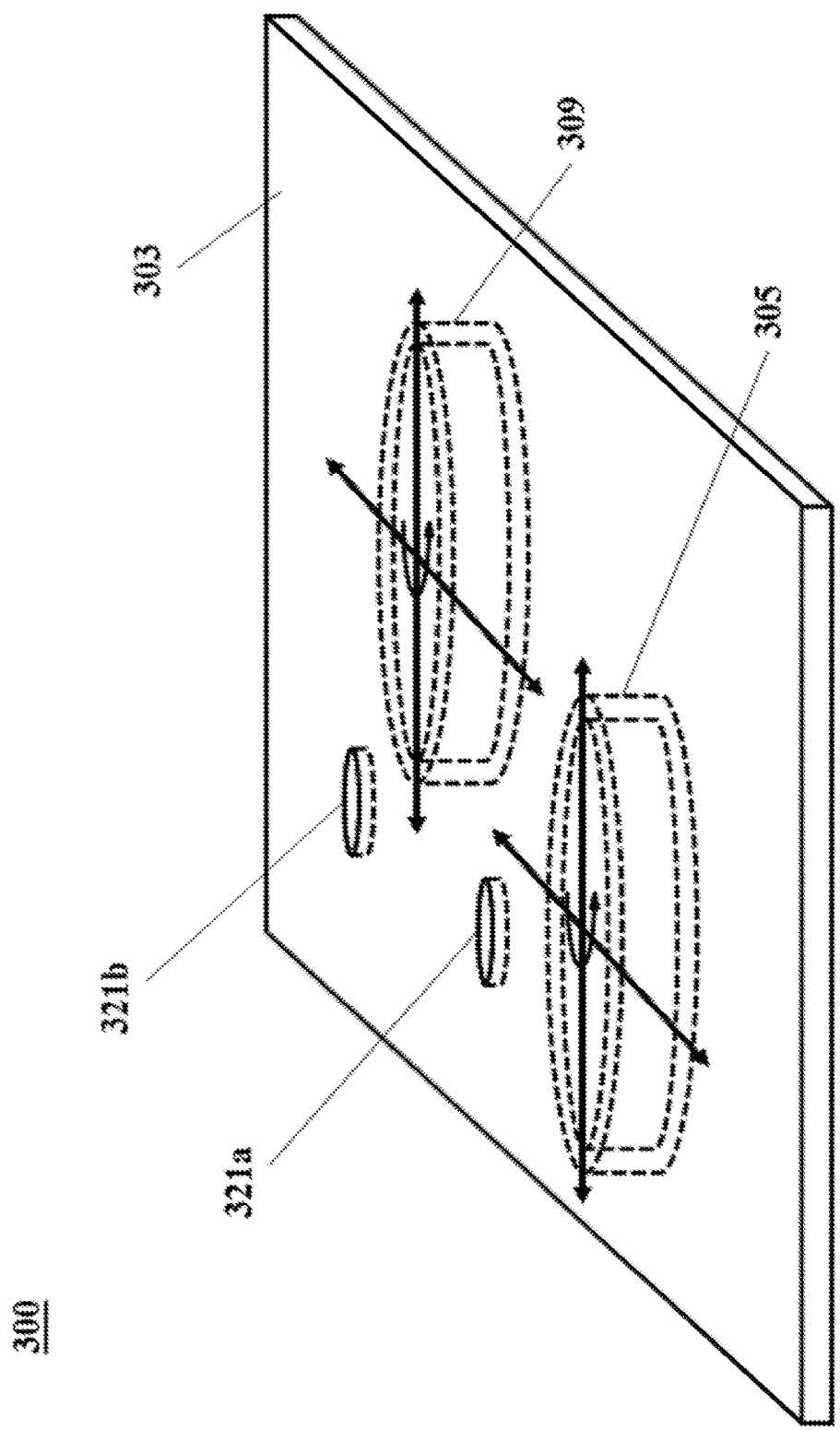
FIG. 3 illustrates a barrier system having multiple sample environments.

The systems of the present disclosure may be scaled, such as to have multiple sample environment regions defined by the same plate. FIG. 3 illustrates a barrier system 300 having multiple sample environments. The barrier system 300, and/or respective components thereof, may correspond to any other barrier system described herein (e.g., 100 and/or 200) and/or respective components thereof.

A single plate 303 may define at least two independent sample environments 305, 309, which are further defined by two independent chambers. Each sample environment may be controlled and maintained independent of other sample environments. Each sample environment may be movable relative to the plate 303 independent of the other sample environments. A fluid barrier may be maintained between each sample environment and the external environment.

While two sample environments are illustrated in FIG. 3, it will be appreciated that systems of the present disclosure may be implemented for any number of sample environments using a single plate. For example, there may be at least about 2, 3, 4, 5, 6, 7, 8, 9, 10, 20, 30, 40, 50 or more such sample environments in a single plate system. Alternatively or in addition to, there may be at most about 50, 40, 30, 20, 10, 9, 8, 7, 6, 5, 4, 3, or 2 such sample environments. Any subset of, or all of, the multiple sample environments may be capable of moving independently of other sample environments.

In some instances, a single detector in the plate 303 may be used to detect one or more sample environments. Alternatively or in addition to, a single plate 303 may allow at least two detectors to protrude through the single plate 303 to detect in parallel. For example, such detectors may protrude through the plate via one or more apertures 321$a$, 321$b$ which have fluid-tight fits with the detectors. The detectors may be fixed relative to the plate. In some instances, the multiple detectors may detect two different locations in the same sample environment in parallel. In some instances, the multiple detectors may detect at least two different sample environments in parallel.

While two detector apertures are illustrated in FIG. 3, it will be appreciated that systems of the present disclosure may be implemented for any number of detectors using a single plate. For example, there may be at least about 2, 3, 4, 5, 6, 7, 8, 9, 10, 20, 30, 40, 50 or more detectors in a single plate system. Alternatively or in addition to, there may be at most about 50, 40, 30, 20, 10, 9, 8, 7, 6, 5, 4, 3, or 2 such detectors.

The sample environments (e.g., 105, 205, 305, 309) of the present disclosure may be controlled. For instance, the environment may be maintained at a specified temperature or humidity. The environment (or any element thereof) may be maintained at a temperature of at least about 20 degrees Celsius (° C.), 25° C., 30° C., 35° C., 40° C., 45° C., 50° C., 55° C., 60° C., 65° C., 70° C., 75° C., 80° C., 85° C., 90° C., 95° C., 100° C. or higher. Alternatively, the environment may be maintained at less than 20° C. Alternatively or in addition to, the environment (or any element thereof) may be maintained at a temperature of at most about 100° C., 95° C., 90° C., 85° C., 80° C., 75° C., 70° C., 65° C., 60° C., 55° C., 50° C., 45° C., 40° C., 35° C., 30° C., at 25° C., 20° C., or lower. The environment may be maintained at a temperature that is within a range defined by any two of the preceding values.

Different elements of the sample environment, such as the chamber, protruding portion of the detector, immersion fluid, plate, substrates, solutions, and/or samples therein may be maintained at different temperatures or within different temperature ranges, such as the temperatures or temperature ranges described herein. Elements of the system may be set at temperatures above the dewpoint to prevent condensation. Elements of the system may be set at temperatures below the dewpoint to collect condensation.

In some instances, the sample environments may be maintained at higher humidity than an external environment. In some instances, the sample environments may be maintained at a relative humidity of at least about 5%, 10%, 15%, 20%, 25%, 30%, 35%, 40%, 45%, 50%, 55%, 60%, 65%, 70%, 75%, 80%, 85%, 90%, 95%, or 100%. Alternatively or in addition to, the relative humidity may be maintained at at most about 100%, 95%, 90%, 85%, 80%, 75%, 70%, 65%, 60%, 55%, 50%, 45%, 40%, 35%, 30%, 25 20%, 15%, 10%, 5%, or less. Alternatively or in addition to, the relative humidity may be maintained within a range defined by any two of the preceding values.

An environmental unit (e.g., humidifiers, heaters, heat exchangers, compressors, etc.) may be configured to regulate one or more operating conditions in each sample environment. In some instances, each environment may be regulated by independent environmental units. In some instances, a single environmental unit may regulate a plurality of environments. In some instances, a plurality of environmental units may, individually or collectively, regulate the different environments. An environmental unit may use active methods or passive methods to regulate the operating conditions. For example, the temperature may be controlled using heating or cooling elements. The humidity may be controlled using humidifiers or dehumidifiers.

In some instances, a first part of the sample environment may be further controlled from other parts of the sample environment. Different local parts may have different local temperatures, pressures, and/or humidity. For example, the sample environment may comprise a first internal or local environment and a second internal or local environment, for example separated by a seal. In some instances, the seal may comprise an immersion objective lens, as described elsewhere herein. For example, the immersion objective lens may be part of a seal that separates the sample environment into a first internal environment having 100% (or substantially 100%) relative humidity and a second environment having a different temperature, pressure or humidity. The second environment may or may not be an ambient environment. The immersion objective lens may be in contact a detector.

Figure 4:
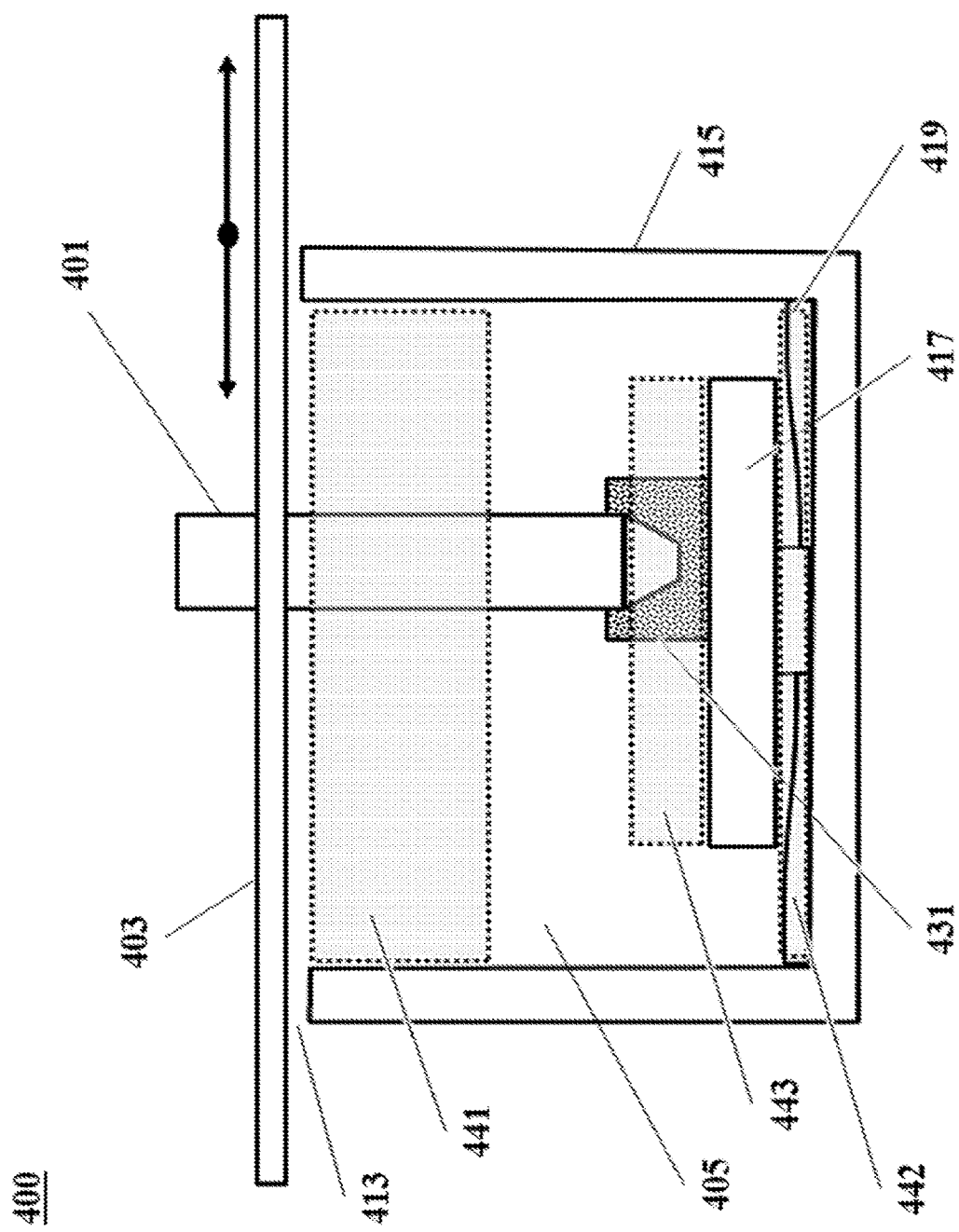
FIG. 4 illustrates an example barrier system comprising different local environments.

FIG. 4 illustrates an example barrier system 400 comprising different local environments 441, 442, 443, showing a cross-sectional side view. The example barrier system 400, and one or more components therein, may correspond to the example barrier system 100, and one or more components therein. A fluid barrier 413 may be implemented between a sample environment 405 (e.g., first region) and an external environment (e.g., second region). The sample environment 405 may be a controlled environment, comprising one or more samples therein. The external environment may be a closed or open environment. The sample environment 405 region may be defined by a chamber 415, a plate 403, and the fluid barrier 413. The fluid barrier 413 may be maintained between a physical gap between the chamber 415 and the plate 403. The chamber 415 and the plate 403 may be independent such that the chamber 145, and the sample environment 405 region defined thereby, is movable relative to the plate 403. The plate 403 and the chamber 415 may not be in direct mechanical contact, such that there is a minimal distance between the plate and the chamber. The fluid barrier 413 may comprise fluid from the sample environment, the external environment, or both, and act as a transition region between the sample environment 405 and the external environment.

The sample environment 405 may comprise a substrate 417. One or more samples may be immobilized on or adjacent to the substrate 417. Alternatively or in addition to, the one or more samples may otherwise be disposed on the substrate 417. In some instances, at least a part of the chamber 415 may be or comprise a substrate 417. In other instances, the chamber 415 may be coupled to a substrate 417. In some instances, the substrate 417 may be fixed relative to the chamber 415. Alternatively, the substrate 417 may be movable relative to the chamber 415, for example, in a linear and/or non-linear (e.g., rotational) direction. For example, the substrate 417 may be fixed in XY coordinates (and/or Z coordinates) to the chamber 415, but rotatable relative to the chamber 415.

A detector 401 may protrude into the sample environment 105 from the external environment through the plate 403, such as through an aperture in the plate 403. At least a portion of the detector 401 may be fixed relative to the plate 403. In some instances, the detector 401 may be capable of translating along an axis that is substantially normal to the plane of the plate 403 (e.g., through the aperture) independent of the plate 403. Within the sample environment 405, the detector 401 may be configured to detect the one or more samples disposed on the substrate using an immersion optical system, such as the system described with respect to FIG. 1C. A portion of the detector 401 inside the sample environment 405, such as an optical imaging objective, may be in optical communication with the substrate through a liquid fluid 431 medium. In some instances, the liquid fluid medium may be disposed on a local region of the substrate 417. Alternatively, the detector 401 may be in optical communication with the substrate without the liquid fluid medium.

The sample environment 405 may comprise any number of different local environments 441, 442, 443 located at different parts of the sample environment. The different local environments may be regulated. The fluid barrier 413 may maintain the different local environments at different local environmental conditions. For example, a local environment may be maintained at a local temperature or local temperature range. For example, a local environment may be maintained at a local humidity or local humidity range. For example, a local environment may be maintained at a local pressure or local pressure range. A local temperature may be at least about 20 degrees Celsius (° C.), 25° C., 30° C., 35° C., 40° C., 45° C., 50° C., 55° C., 60° C., 65° C., 70° C., 75° C., 80° C., 85° C., 90° C., 95° C., 100° C. or higher. Alternatively, the local temperature may be maintained at less than 20° C. Alternatively or in addition to, the local temperature may be at most about 100° C., 95° C., 90° C., 85° C., 80° C., 75° C., 70° C., 65° C., 60° C., 55° C., 50° C., 45° C., 40° C., 35° C., 30° C., at 25° C., 20° C., or lower. The local environment may be maintained at a local temperature that is within a range defined by any two of the preceding values. A local relative humidity may be at least about 5%, 10%, 15%, 20%, 25%, 30%, 35%, 40%, 45%, 50%, 55%, 60%, 65%, 70%, 75%, 80%, 85%, 90%, 95%, or 100%. Alternatively or in addition to, the local relative humidity may be at most about 100%, 95%, 90%, 85%, 80%, 75%, 70%, 65%, 60%, 55%, 50%, 45%, 40%, 35%, 30%, 25 20%, 15%, 10%, 5%, or less. Alternatively or in addition to, the relative humidity may be maintained within a range defined by any two of the preceding values. The local environment maybe maintained using any of the environmental units described herein.

In the example illustrated in FIG. 4, a first local environment 441 located at or near the top of the sample environment 405 (or chamber 415) is maintained as the highest local temperature within the sample environment 405, such as to prevent condensation and dripping down of undesired materials onto the substrate 417. A second local environment 442 comprises a source of humidity 419, such as a body of liquid (e.g., water), at or near the bottom of the sample environment 405 (or chamber 415). The second local environment 442 may be maintained at the second highest local temperature within the sample environment 405, such as to generate vapor from the source of humidity 419. A third local environment 443 is located at or near a surface of the substrate 417, and maintained as the lowest local temperature within the sample environment 405, such as to prevent drying out of the surface. While three local environments are illustrated, it will be appreciated that a sample environment may have any number of different local environments maintained at different local environmental conditions, such as at least 1, 2, 3, 4, 5, 6, 7, 8, 9, 10 or more local environments.

An objective of the detector 401 may be heated to prevent condensation and disruption of an optical path between the objective and the substrate 417. Alternatively or in addition to, another component or part of the detector in fluid contact with the substrate may be heated. The term, "heating," as used herein may generally refer to subjecting an object to temperature increase compared to a reference temperature prior to the heating operation. The heating may be performed by an environmental unit as described herein. The heating may be performed by heating or maintaining a temperature (or range thereof) of a volume of immersion fluid in contact with the detector and the substrate. A heating element may be coupled or integrated with the objective (and/or other component of the detector).

Provided is a system for processing or analyzing an analyte, comprising: a chamber and a lid. The chamber may comprise an internal region comprising a substrate configured to immobilize the analyte immobilized thereto. The lid may be configured to be disposed adjacent to the chamber. The system may comprise an environmental unit configured to maintain a first local environment, a second local environment, and a third local environment within the internal region. The environmental unit can be configured to maintain the first local environment at a first temperature or temperature range, the second local environment at a second temperature or temperature range, and the third local environment at third temperature or temperature range. The first local environment may be disposed above the second local environment and the third local environment. The first local environment may be at or in proximity to the lid. The second local environment may be disposed at or in proximity to a surface of the substrate. The third local environment may be disposed below the first local environment and the second local environment. The first temperature or temperature range may be higher than the second temperature or temperature range and the third temperature or temperature range. The second temperature or temperature range may be lower than the third temperature or temperature range.

Figure 5:
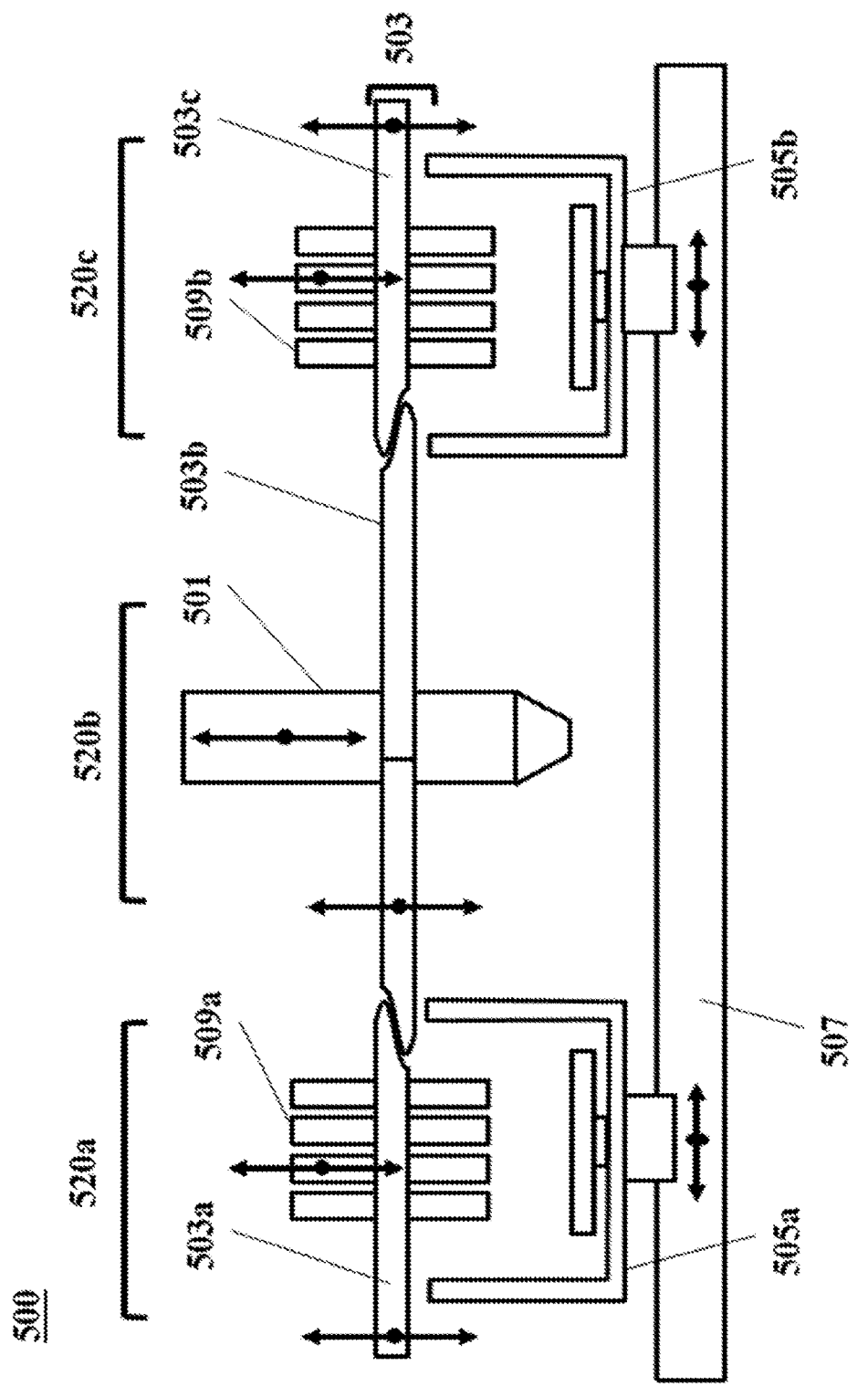
FIG. 5 illustrates a processing system comprising an example barrier system.

FIG. 5 illustrates a processing system 500 comprising an example barrier system. The processing system 500 may comprise one or more modular components.

The processing system 500 may comprise one or more barrier systems, such as a first barrier system 505*a* and a second barrier system 505*b*. A barrier system (e.g., 505*a*, 505*b*) of the processing system 500, and one or more components thereof, may correspond to any barrier system, and one or more components thereof, described herein. While two barrier systems are illustrated in FIG. 5, it will be appreciated that a processing system may have any number of barrier systems.

In some instances, any barrier system of the present disclosure may be used to process operations alternative to or in addition to detection.

For example, any barrier system of the present disclosure may have one or more operating units alternative to or in addition to a detector (e.g., 501). An operating unit may comprise one or more devices or assembly thereof, and be configured to facilitate an operation with respect to a sample or the sample environment (or local environment(s) thereof). For example, an operating unit may comprise one or more detectors configured to facilitate detection of a signal or signal change from a sample. In another example, an operating unit may comprise a fluid dispenser (e.g., 509*a*, 509*b*) configured to facilitate reagent or fluid dispensing to a sample. In another example, an operating unit may comprise an environmental unit configured to facilitate environment regulation of a sample environment. In another example, an operating unit may comprise a light source, heat source, or humidity source. In another example, an operating unit may comprise any one or more sensors. A barrier system may have multiple operating units, of the same or different types.

An operating unit (e.g., 509*a*) may protrude into the sample environment of a barrier system from the external environment through the plate (e.g., 503), such as through an aperture in the plate. The fit between the operating unit and the aperture may be fluid-tight such that there is no fluid communication through the aperture when the operating unit is fitted through the aperture. Alternatively or in addition to, the aperture may be hermetically sealed. Alternatively, the plate may be integral to the operating unit, or the operating unit may be integral to the plate. Alternatively, the operating unit may be entirely contained in the sample environment, for example, by affixing a non-sample facing end to the plate. In some instances, at least a portion of the operating unit may be fixed relative to the plate. In some instances, the operating unit may be capable of translating along an axis that is substantially normal to the plane of the plate (e.g., through the aperture) independent of the plate. In some instances, at least a portion of the operating unit (e.g., a portion of the operating unit inside the sample environment region) may be capable of moving (e.g., linearly or nonlinearly, such as rotating) independent of the plate.

In some instances, the processing system 500 may comprise a plurality of modular plates (e.g., 503*a*, 503*b*, 503*c*) that may be coupled or otherwise fastened to each other to create an uninterrupted plate 503. The fit between adjoining modular plates may be fluid-tight such that there is no fluid communication between the modular plates. Alternatively or in addition to, the fit may comprise a hermetic seal. Adjoining modular plates (e.g., a first modular plate and a second modular plate) may be coupled via one or more fastening mechanisms. Examples of fastening mechanisms may include, but are not limited to, complementary threading, form-fitting pairs, hooks and loops, latches, threads, screws, staples, clips, clamps, prongs, rings, brads, rubber bands, rivets, grommets, pins, ties, snaps, velcro, adhesives (e.g., glue), tapes, vacuum, seals, magnets, magnetic seals, a combination thereof, or any other types of fastening mechanisms.

In some instances, the first modular plate and the second modular plate can be fastened to each other via complementary fastening units. For example, the first modular plate and the second modular plate can complete a form-fitting pair. The first modular plate can comprise a form-fitting male component and the second modular plate can comprise a form-fitting female component, and/or vice versa. In some instances, an outer diameter of a protrusion-type fastening unit of the first modular plate can be substantially equal to an inner diameter of a depression-type fastening unit of the second modular plate, or vice versa, to form an interference fit. Alternatively or in addition to, the two modular plates can comprise other types of complementary units or structures (e.g., hook and loop, latches, snap-ons, buttons, nuts and bolts, magnets, etc.) that can be fastened together. Alternatively or in addition to, the two modular plates can be fastened using other fastening mechanisms, such as but not limited to staples, clips, clamps, prongs, rings, brads, rubber bands, rivets, grommets, pins, ties, snaps, velcro, adhesives (e.g., glue), magnets or magnetic fields, tapes, a combination thereof, or any other types of fastening mechanisms.

In some instances, the first modular plate and the second modular plate can be fastened to each other via an intermediary structure. The intermediary structure may be a linker or connector between the first modular plate and the second modular plate. In some instances, the intermediary structure may be fastened to one or both of the first modular plate and the second modular plate through one or more of any of the fastening mechanisms described herein. The intermediary structure may be solid. The intermediary structure may be liquid or gas. The intermediary structure may be a gel. In some instances, the intermediary structure may be applied as one phase (e.g., liquid) and transform into another phase (e.g., solid) after passage of time such as to achieve the fastening. For example, the intermediary structure may comprise a fluid adhesive that solidifies to achieve the fastening. In some instances, the intermediary structure may be capable of transforming from a first phase to a second phase, such as from liquid to solid or from solid to liquid, upon application of a stimulus (e.g., thermal change, pH change, pressure change, magnetic field, electric field, etc.) to achieve fastening or unfastening (or both). In some instances, the first modular plate and/or the second modular plate may comprise the intermediary structure. For example, the intermediary structure may be integral to the first modular plate and/or the second modular plate. In some instances, the first modular plate and/or the second modular plate, in part or entirely, may be capable of transforming from a first phase to a second phase, such as from liquid to solid or from solid to liquid, upon application of a stimulus (e.g., thermal change, pH change, pressure change, magnetic field, electric field, etc.) to achieve fastening or unfastening (or both) to the other plate. In some instances, one or both of the two modular plates can be cut into or pierced by the other when the two modular plates are fastened together.

The fastening between the first modular plate and the second modular plate can be temporary, such as to allow for subsequent unfastening of the two modular plates without damage (e.g., permanent deformation, disfigurement, etc.) to the two modular plates or with minimal damage. In some instances, the first modular plate may be capable of repeatedly and readily unfastening from the second modular plate and/or from the remainder of the plate 503.

In some instances, a modular plate may be detachable from another modular plate or a remainder of the plate without disturbing one or more sample environments of respective one or more barrier systems that comprise at least a part of the remainder of the plate, such as during an operation by one or more operating units (e.g., reagent dispensing, washing, detecting, etc.) of the one or more barrier systems. Beneficially, the detachment of a modular plate may allow access to the chamber, such as to load or unload a chamber in the processing system 500. The detachment of a modular plate may also allow access to an interior of a chamber of a barrier system, such as to load or unload a substrate from the chamber. The detachment of a modular plate may also allow access to one or more operating units coupled to or otherwise associated with the detached modular plate, such as for maintenance, repair, and/or replacement of the one or more operating units. Such detachment may occur while another barrier system carries on with regular operation (e.g., chemical processing operation, detection operation, etc.). In some instances, the detachment of a modular plate may be along a Z-axis or substantially Z-axis, or along any other axis (e.g., X-Y plane, etc.). In some instances, any modular plate may be detachable from another modular plate. In some instances, any modular plate may be movable relative to another modular plate. In some instances, any modular plate may be movable with respect to a reference coordinate during detachment. In some instances, any modular plate may be substantially stationary with respect to a reference coordinate during detachment. In some instances, a first modular plate (e.g., 520a, 520c, etc.) may be movable and a second modular plate (e.g., 520b) may be stationary with respect to a reference coordinate.

The processing system 500 may comprise different operating stations (e.g., 520a, 502b, 520c). An operating station may be positioned relative to a section of the plate 503. In some instances, a single modular plate may comprise one or more operating units for an operating station. In some instances, multiple modular plates may comprise one or more operating units for an operating station. In some instances, a single modular plate may comprise one or more operating units for multiple operating stations. In some instances, multiple modular plates may comprise one or more operating units for multiple operating stations. An operating station may comprise a chemical operating station (e.g., 520a, 520c), such as for reagent dispensing and/or washing. An operating station may comprise a detecting station (e.g., 520b), such as for detection of a signal or signal change. Any barrier system (e.g., 505a, 505b) of the processing system may be capable of traveling between different operating stations. Alternatively or in addition to, the plate 503 may be capable of traveling relative to any barrier system to position a barrier system with respect to an operating station (e.g., located with respect to a section of the plate). In some instances, a barrier system may be provided a rail or track 507 or other motion path to allow for travel between the different operating stations. In some instances, different barrier systems may share the same rail or track or other motion path for travel between the different operating systems (e.g., as illustrated in FIG. 5). In such cases, the different barrier systems may be configured to move independent of each other on the same rail or track or other motion path, or move in unison. In some instances, different barrier systems may move on a dedicated, separate rail or track or other motion path. In some instances, the fluid barrier of a barrier system may be maintained during relative motion between the plate 503 and the barrier system, such as during switch of operating stations. In some cases, the one or more operating units may be capable of movement relative to the plate 503 (such as along an axis normal to the plate) or removal from the plate 503 to allow a barrier system to be positioned with respect to an operating station.

External environments (e.g., 107, 207) of the present disclosure may be any environment external to the sample environments. For example, the external environment may be a room environment. The external environment may be an ambient environment. The external environment may itself be controlled, such as via one or more environmental units described elsewhere herein. The external environment may be open or closed. In some instances, the external environment may be at room temperature, pressure, and/or humidity. In some instances, the external environment may be at ambient temperature, pressure, and/or humidity.

Chambers (e.g., 115, 215, 415) of the present disclosure may comprise a base and side walls to define an opening that nearly contacts the plate (or lid). The side walls may be a closed continuous surface, or a plurality of adjacent (and/or adjoining) surfaces. For example, the base may comprise or be the substrate. In some instances, the base may be coupled to the substrate. The substrate may be translationally fixed to the base. The substrate may be rotatable relative to the base. Translational motion may include movement of an object from a first coordinate to a second coordinate. Translational motion may include movement of a reference point of an object from a first coordinate to a second coordinate. In some instances, at least a portion of a side wall of the chamber may have thickness dimensions large enough to allow integration of one or more fluid channels to allow operation of the pressure-altering apparatus. In some instances, a side wall of the chamber may have thickness dimensions large enough to maintain the low pressure fluid barrier. The chamber may entirely or partially comprise one or more of glass, silicon, a metal such as aluminum, copper, titanium, chromium, or steel, a ceramic such as titanium oxide or silicon nitride, a plastic such as polyethylene (PE), low-density polyethylene (LDPE), high-density polyethylene (HDPE), polypropylene (PP), polystyrene (PS), high impact polystyrene (HIPS), polyvinyl chloride (PVC), polyvinylidene chloride (PVDC), acrylonitrile butadiene styrene (ABS), polyacetylene, polyamides, polycarbonates, polyesters, polyurethanes, polyepoxide, polymethyl methacrylate (PMMA), polytetrafluoroethylene (PTFE), phenol formaldehyde (PF), melamine formaldehyde (MF), urea-formaldehyde (UF), polyetheretherketone (PEEK), polyetherimide (PEI), polyimides, polylactic acid (PLA), furans, silicones, polysulfones, any mixture of any of the preceding materials, or any other appropriate material.

Substrates (e.g., 417) of the present disclosure may be an open substrate. The substrate may be a solid substrate. The substrate may entirely or partially comprise one or more of glass, silicon, a metal such as aluminum, copper, titanium, chromium, or steel, a ceramic such as titanium oxide or silicon nitride, a plastic such as polyethylene (PE), low-density polyethylene (LDPE), high-density polyethylene (HDPE), polypropylene (PP), polystyrene (PS), high impact polystyrene (HIPS), polyvinyl chloride (PVC), polyvinylidene chloride (PVDC), acrylonitrile butadiene styrene (ABS), polyacetylene, polyamides, polycarbonates, polyesters, polyurethanes, polyepoxide, polymethyl methacrylate (PMMA), polytetrafluoroethylene (PTFE), phenol formaldehyde (PF), melamine formaldehyde (MF), urea-formaldehyde (UF), polyetheretherketone (PEEK), polyetherimide (PEI), polyimides, polylactic acid (PLA), furans, silicones, polysulfones, any mixture of any of the preceding materials, or any other appropriate material. The substrate may be entirely or partially coated with one or more layers of a metal such as aluminum, copper, silver, or gold, an oxide such as a silicon oxide ($Si_xO_y$, where x, y may take on any possible values), a photoresist such as SUB, a surface coating such as an aminosilane or hydrogel, polyacrylic acid, polyacrylamide dextran, polyethylene glycol (PEG), or any combination of any of the preceding materials, or any other appropriate coating. The one or more layers may have a thickness of at least 1 nanometer (nm), at least 2 nm, at least 5 nm, at least 10 nm, at least 20 nm, at least 50 nm, at least 100 nm, at least 200 nm, at least 500 nm, at least 1 micrometer (µm), at least 2 µm, at least 5 µm, at least 10 µm, at least 20 µm, at least 50 µm, at least 100 µm, at least 200 µm, at least 500 µm, or at least 1 millimeter (mm). The one or more layers may have a thickness that is within a range defined by any two of the preceding values.

The substrate and/or chamber may have any shape, form or dimension. In some instances, for example, the substrate may have the general form of a cylinder, a cylindrical shell or disk, a rectangular prism, or any other geometric form. The substrate may have a thickness (e.g., a minimum dimension) of at least about 100 µm, 200 µm, 300 µm, 400 µm, 500 µm, 1 mm, 2 mm, 3 mm, 4 mm, 5 mm, 1 cm, 2 cm, 3 cm, 4 cm, 5 cm or more. The substrate may have a thickness that is within a range defined by any two of the preceding values. The substrate may have a first lateral dimension (such as a width for a substrate having the general form of a rectangular prism or a radius for a substrate having the general form of a cylinder) of at least about 1 mm, 2 mm, 3 mm, 4 mm, 5 mm, 1 cm, 2 cm, 3 cm, 4 cm, 5 cm, 6 cm, 7 cm, 8 cm, 9 cm, 10 cm, 20 cm, 30 cm, 40 cm, 50 cm, 60 cm, 70 cm, 80 cm, 90 cm, 1 meter (m) or more. The substrate may have a first lateral dimension that is within a range defined by any two of the preceding values. The substrate may have a second lateral dimension (such as a length for a substrate having the general form of a rectangular prism) or at least at least about 1 mm, 2 mm, 3 mm, 4 mm, 5 mm, 1 cm, 2 cm, 3 cm, 4 cm, 5 cm, 6 cm, 7 cm, 8 cm, 9 cm, 10 cm, 20 cm, 30 cm, 40 cm, 50 cm, 60 cm, 70 cm, 80 cm, 90 cm, 1 meter (m) or more. The substrate may have a second lateral dimension that is within a range defined by any two of the preceding values. A surface of the substrate may be planar or substantially planar. Alternatively or in addition to, a surface of the substrate may be textured or patterned. For example, the substrate may comprise grooves, troughs, hills, and/or pillars. In some instances, the substrate may comprise wells. In some instances, the substrate may define one or more cavities (e.g., micro-scale cavities or nano-scale cavities). The substrate may have a regular textures and/or patterns across the surface of the substrate. For example, the substrate may have regular geometric structures (e.g., wedges, cuboids, cylinders, spheroids, hemispheres, etc.) above or below a reference level of the surface. Alternatively, the substrate may have irregular textures and/or patterns across the surface of the substrate. For example, the substrate may have any arbitrary structure above or below a reference level of the substrate. In some instances, a texture of the substrate may comprise structures having a maximum dimension of at most about 100%, 90%, 80%, 70%, 60%, 50%, 40%, 30%, 20%, 10%, 9%, 8%, 7%, 6%, 5%, 4%, 3%, 2%, 1%, 0.1%, 0.01%, 0.001%, 0.0001%, 0.00001% of the total thickness of the substrate or a layer of the substrate. In some instances, the textures and/or patterns of the substrate may define at least part of an individually addressable location on the substrate. A textured and/or patterned substrate may be substantially planar.

Figure 6:
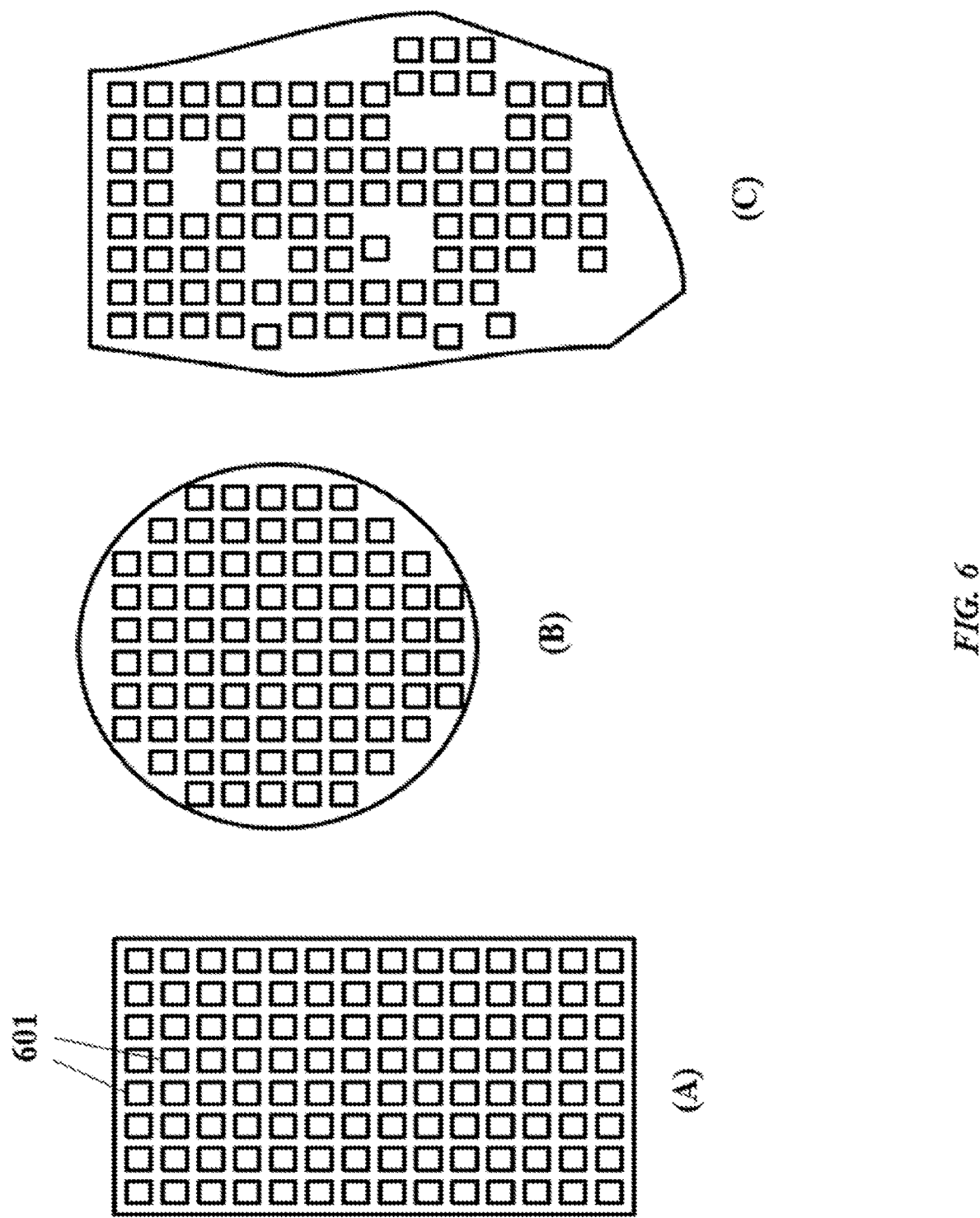
FIG. 6 illustrates examples of arrays on a substrate.

The substrate may comprise an array. For instance, the array may be located on a lateral surface of the substrate. The array may be a planar array. The array may have the general shape of a circle, annulus, rectangle, or any other shape. The array may comprise linear and/or non-linear rows. The array may be evenly spaced or distributed. The array may be arbitrarily spaced or distributed. The array may have regular spacing. The array may have irregular spacing. The array may be a textured array. The array may be a patterned array. FIG. 6 illustrates examples of arrays of individually addressable locations 601 on a substrate (e.g., from a top view), with panel A showing a substantially rectangular substrate with regular linear arrays, panel B showing a substantially circular substrate with regular linear arrays, and panel C showing an arbitrarily shaped substrate with irregular arrays.

The array may comprise a plurality of individually addressable locations (e.g., 501). In some instances, the locations may correspond to individually addressable coordinates on the substrate. Alternatively or in addition to, the locations may correspond to physical structures (e.g., wells) on the substrate. An analyte to be processed and/or detected by the detector may be immobilized to the array. The array may comprise one or more binders described herein, such as one or more physical linkers or adapters or chemical linkers or adapters that are coupled to, or configured to couple to, an analyte. For instance, the array may comprise a linker or adaptor that is coupled to a nucleic acid molecule. Alternatively or in addition to, the analyte may be coupled to a bead, and the bead may be immobilized to the array.

The individually addressable locations may comprise locations of analytes or groups of analytes that are accessible for manipulation. The manipulation may comprise placement, extraction, reagent dispensing, seeding, heating, cooling, or agitation. The extraction may comprise extracting individual analytes or groups of analytes. For instance, the extraction may comprise extracting at least 2, at least 5, at least 10, at least 20, at least 50, at least 100, at least 200, at least 500, or at least 1,000 analytes or groups of analytes. Alternatively or in addition to, the extraction may comprise extracting at most 1,000, at most 500, at most 200, at most 100, at most 50, at most 20, at most 10, at most 5, or at most 2 analytes or groups of analytes. The manipulation may be accomplished through, for example, localized microfluidic, pipet, optical, laser, acoustic, magnetic, and/or electromagnetic interactions with the analyte or its surroundings.

The array may be coated with binders. For instance, the array may be randomly coated with binders. Alternatively, the array may be coated with binders arranged in a regular pattern (e.g., in linear arrays, radial arrays, hexagonal arrays etc.). The array may be coated with binders on at least 10%, at least 20%, at least 30%, at least 40%, at least 50%, at least 60%, at least 70%, at least 80%, at least 90%, at least 91%, at least 92%, at least 93%, at least 94%, at least 95%, at least 96%, at least 97%, at least 98%, or at least 99% of the number of individually addressable locations, or of the surface area of the substrate. The array may be coated with binders on a fraction of individually addressable locations, or of the surface areas of the substrate, that is within a range defined by any two of the preceding values. The binders may be integral to the array. The binders may be added to the array. For instance, the binders may be added to the array as one or more coating layers on the array.

The binders may immobilize analytes through non-specific interactions, such as one or more of hydrophilic interactions, hydrophobic interactions, electrostatic interactions, physical interactions (for instance, adhesion to pillars or settling within wells), and the like. In some instances, the binders may immobilize biological analytes through specific interactions. For instance, where a biological analyte is a nucleic acid molecule, the binders may comprise oligonucleotide adaptors configured to bind to the nucleic acid molecule. Alternatively or in addition to, such as to bind other types of analytes, the binders may comprise one or more of antibodies, oligonucleotides, aptamers, affinity binding proteins, lipids, carbohydrates, and the like. The binders may immobilize biological analytes through any possible combination of interactions. For instance, the binders may immobilize nucleic acid molecules through a combination of physical and chemical interactions, through a combination of protein and nucleic acid interactions, etc. The array may comprise at least about 10, 100, 1000, 10,000, 100,000, 1,000,000, 10,000,000, 100,000,000 or more binders. Alternatively or in addition to, the array may comprise at most about 100,000,000, 10,000,000, 1,000,000, 100,000, 10,000, 1000, 100, 10 or fewer binders. The array may have a number of binders that is within a range defined by any two of the preceding values. In some instances, a single binder may bind a single analyte (e.g., nucleic acid molecule). In some instances, a single binder may bind a plurality of analytes (e.g., plurality of nucleic acid molecules). In some instances, a plurality of binders may bind a single analyte. Though some examples herein describe interactions of binders with nucleic acid molecules, the binders may immobilize other molecules (such as proteins), other particles, cells, viruses, other organisms, or the like, and non-biological analytes.

In some instances, each location, or a subset of such locations, may have immobilized thereto an analyte (e.g., a nucleic acid molecule, a protein molecule, a carbohydrate molecule, etc.). In other instances, a fraction of the plurality of individually addressable location may have immobilized thereto an analyte. A plurality of analytes immobilized to the substrate may be copies of a template analyte. For example, the plurality of analytes (e.g., nucleic acid molecules) may have sequence homology. In other instances, the plurality of analytes immobilized to the substrate may not be copies. The plurality of analytes may be of the same type of analyte (e.g., a nucleic acid molecule) or may be a combination of different types of analytes (e.g., nucleic acid molecules, protein molecules, etc.).

In some instances, the array may comprise a plurality of types of binders, such as to bind different types of analytes. For example, the array may comprise a first type of binders (e.g., oligonucleotides) configured to bind a first type of analyte (e.g., nucleic acid molecules), and a second type of binders (e.g., antibodies) configured to bind a second type of analyte (e.g., proteins), and the like. In another example, the array may comprise a first type of binders (e.g., first type of oligonucleotide molecules) to bind a first type of nucleic acid molecules and a second type of binders (e.g., second type of oligonucleotide molecules) to bind a second type of nucleic acid molecules, and the like. For example, the substrate may be configured to bind different types of analytes in certain fractions or specific locations on the substrate by having the different types of binders in the certain fractions or specific locations on the substrate.

An analyte may be immobilized to the array at a given individually addressable location of the plurality of individually addressable locations. An array may have any number of individually addressable locations. For instance, the array may have at least 1, at least 2, at least 5, at least 10, at least 20, at least 50, at least 100, at least 200, at least 500, at least 1,000, at least 2,000, at least 5,000, at least 10,000, at least 20,000, at least 50,000, at least 100,000, at least 200,000, at least 500,000, at least 1,000,000, at least 2,000,000, at least 5,000,000, at least 10,000,000, at least 20,000,000, at least 50,000,000, at least 100,000,000, at least 200,000,000, at least 500,000,000, at least 1,000,000,000, at least 2,000,000,000, at least 5,000,000,000, at least 10,000,000,000, at least 20,000,000,000, at least 50,000,000,000, or at least 100,000,000,000 individually addressable locations. The array may have a number of individually addressable locations that is within a range defined by any two of the preceding values. Each individually addressable location may be digitally and/or physically accessible individually (from the plurality of individually addressable locations). For example, each individually addressable location may be located, identified, and/or accessed electronically or digitally for mapping, sensing, associating with a device (e.g., detector, processor, dispenser, etc.), or otherwise processing. Alternatively or in addition to, each individually addressable location may be located, identified, and/or accessed physically, such as for physical manipulation or extraction of an analyte, reagent, particle, or other component located at an individually addressable location.

Each individually addressable location may have the general shape or form of a circle, rectangle, pit, bump, or any other shape or form. Each individually addressable location may have a first lateral dimension (such as a radius for individually addressable locations having the general shape of a circle or a width for individually addressable locations having the general shape of a rectangle). The first lateral dimension may be at least 1 nanometer (nm), at least 2 nm, at least 5 nm, at least 10 nm, at least 20 nm, at least 50 nm, at least 100 nm, at least 200 nm, at least 500 nm, at least 1,000 nm, at least 2,000 nm, at least 5,000 nm, or at least 10,000 nm. The first lateral dimension may be within a range defined by any two of the preceding values. Each individually addressable location may have a second lateral dimension (such as a length for individually addressable locations having the general shape of a rectangle). The second lateral dimension may be at least 1 nanometer (nm), at least 2 nm, at least 5 nm, at least 10 nm, at least 20 nm, at least 50 nm, at least 100 nm, at least 200 nm, at least 500 nm, at least 1,000 nm, at least 2,000 nm, at least 5,000 nm, or at least 10,000 nm. The second lateral dimension may be within a range defined by any two of the preceding values. In some instances, each individually addressable locations may have or be coupled to a binder, as described herein, to immobilize a analyte thereto. In some instances, only a fraction of the individually addressable locations may have or be coupled to a binder. In some instances, an individually addressable location may have or be coupled to a plurality of binders to immobilize an analyte thereto.

The analytes bound to the individually addressable locations may include, but are not limited to, molecules, cells, organisms, nucleic acid molecules, nucleic acid colonies, beads, clusters, polonies, or DNA nanoballs. The bound analytes may be immobilized to the array in a regular, patterned, periodic, random, or pseudo-random configuration, or any other spatial arrangement.

While examples of the present disclosure describe the processing and/or detection of samples and analytes immobilized to individually addressable locations on a substrate, the systems, devices, and methods described herein also allows for detection of the substrate itself (without any samples and/or analytes disposed thereon).

The substrate may be configured to move with respect to the plate. Such motion may be facilitated by one or more actuators or other devices (e.g., gears, stages, actuators, discs, pulleys, motors, etc.). Such actuators and devices may be mechanically connected to the substrate directly or indirectly via intermediary components. Such actuators and devices may be automated. Alternatively or in addition to, the actuators and devices may receive manual input. The substrate may be configured to move at any speed that allows for detection. In some instances, or rotational motion, the axis of rotation may be an axis through the center of the substrate. The axis may be an off-center axis. For instance, the substrate may be affixed to a chuck (such as a vacuum chuck). The substrate may be configured to rotate with a rotational velocity of at least 1 revolution per minute (rpm), at least 2 rpm, at least 5 rpm, at least 10 rpm, at least 20 rpm, at least 50 rpm, at least 100 rpm, at least 200 rpm, at least 500 rpm, at least 1,000 rpm, at least 2,000 rpm, at least 5,000 rpm, or at least 10,000 rpm. The substrate may be configured to rotate with a rotational velocity that is within a range defined by any two of the preceding values. The substrate may be configured to rotate with different rotational velocities during different operations described herein. The substrate may be configured to rotate with a rotational velocity that varies according to a time-dependent function, such as a ramp, sinusoid, pulse, or other function or combination of functions. The time-varying function may be periodic or aperiodic.

The fluid barriers provided herein may provide zero friction or low friction relative motion between the substrate and the detector. There may be no mechanical contact between the plate (coupled to the detector) and the chamber (coupled to the substrate).

Detectors (e.g., 101, 1110) of the present disclosure may include devices that are capable of detecting a signal. For example, the signal can be a signal indicative of the presence or absence of one or more components (e.g., incorporated nucleotides, fluorescent labels, electronic signals, etc.) and/or a signal indicative of a change of state in one or more components. The detector may detect multiple signals. The signal or multiple signals may be detected in real-time, prior to, during (or substantially during), or subsequent to a reaction, such as a sequencing reaction. In some cases, a detector can include optical and/or electronic components that can detect signals. A detector may implement one or more detection methods. Non-limiting examples of detection methods include optical detection, spectroscopic detection, electrostatic detection, electrochemical detection, acoustic detection, magnetic detection, and the like. Optical detection methods include, but are not limited to, light absorption, ultraviolet-visible (UV-vis) light absorption, infrared light absorption, light scattering, Rayleigh scattering, Raman scattering, surface-enhanced Raman scattering, Mie scattering, fluorescence, luminescence, and phosphorescence. Spectroscopic detection methods include, but are not limited to, mass spectrometry, nuclear magnetic resonance (NMR) spectroscopy, and infrared spectroscopy. Electrostatic detection methods include, but are not limited to, gel based techniques, such as, for example, gel electrophoresis. Electrochemical detection methods include, but are not limited to, electrochemical detection of amplified product after high-performance liquid chromatography separation of the amplified products.

A detectable signal, such as an optical signal (e.g., fluorescent signal), may be generated upon reaction an analyte and another component (e.g., a probe). For example, the signal may originate from the probe and/or the analyte. The detectable signal may be indicative of a reaction or interaction between the probe and the analyte. The detectable signal may be a non-optical signal. For example, the detectable signal may be an electronic signal. The detectable signal may be detected by one or more sensors. For example, an optical signal may be detected via one or more optical detectors in an optical detection scheme described elsewhere herein. The signal may be detected during motion of the substrate. The signal may be detected following termination of the motion. In some instances, after the detection, the signal may be muted, such as by cleaving a label from the probe and/or the analyte, and/or modifying the probe and/or the analyte. Such cleaving and/or modification may be effected by one or more stimuli, such as exposure to a chemical, an enzyme, light (e.g., ultraviolet light), or temperature change (e.g., heat). In some instances, the signal may otherwise become undetectable by deactivating or changing the mode (e.g., detection wavelength) of the one or more sensors, or terminating or reversing an excitation of the signal. In some instances, detection of a signal may comprise capturing an image or generating a digital output (e.g., between different images).

The detectors may be capable of continuous area scanning, during continuous linear motion and/or a continuous non-linear (e.g., rotational) motion between the sample and the substrate. For example, the detectors can scan a substrate or array along a linear or substantially linear path. Alternatively or in addition to, the detectors may scan along a nonlinear path, including in rings, spirals, or arcs on a rotating substrate. The detector may be a continuous area scanning detector. A continuous area scanning detector may comprise an imaging array sensor capable of continuous integration over a scanning area. The scanning may be electronically synchronized to the image of an object in relative motion. A continuous area scanning detector may comprise a time delay and integration (TDI) charge coupled device (CCD), Hybrid TDI, and/or complementary metal oxide semiconductor (CMOS) pseudo TDI.

For rotational scan paths, the scanning direction may be substantially θ in an (R, θ) coordinate system in which the object rotation motion is in a θ direction. Across any field of view on the object (substrate) imaged by a scanning system, the apparent velocity may vary with the radial position (R) of the field point on the $$R\frac{d\theta}{dt}.$$

Continuous area scanning detectors may scan at the same rate for all image positions and therefore may not be able to operate at the correct scan rate for all imaged points in a curved (or arcuate or non-linear) scan. Therefore the scan may be corrupted by velocity blur for imaged field points moving at a velocity different than the scan velocity. Continuous rotational area scanning may comprise an optical detection system or method that makes algorithmic, optical, and/or electronic corrections to substantially compensate for this tangential velocity blur, thereby reducing this scanning aberration. For example, the compensation is accomplished algorithmically by using an image processing algorithm that deconvolves differential velocity blur at various image positions corresponding to different radii on the rotating substrate to compensate for differential velocity blur. In another example, the compensation is accomplished by using an anamorphic magnification gradient. This may serve to magnify the substrate in one axis (anamorphic magnification) by different amounts at two or more substrate positions transverse to the scan direction. The anamorphic magnification gradient may modify the imaged velocities of the two or more positions to be substantially equal thereby compensating for tangential velocity differences of the two positions on the substrate. This compensation may be adjustable to account for different velocity gradients across the field of view at different radii on the substrate. In some instances, the imaging field of view may be segmented into two or more regions, each of which can be electronically controlled to scan at a different rate. These rates may be adjusted to the mean projected object velocity within each region. The regions may be optically defined using one or more beam splitters or one or more mirrors. The two or more regions may be directed to two or more detectors. The regions may be defined as segments of a single detector.

The systems, devices, and methods described herein may have particular biological applications. In some examples, the fluid barrier systems may be used in nucleic acid sequencing applications. A sample environment may be provided within a chamber having a substrate comprising an array. A plurality of nucleic acid molecules may be immobilized to individually addressable locations in the array. A solution of labeled nucleotides may be dispensed to the substrate under conditions sufficient to allow incorporation of at least a subset of the labeled nucleotides into at least a subset of the plurality of nucleic acid molecules, if appropriate (e.g., labeled nucleotides are complementary to an open position in the nucleic acid molecules), and the unincorporated nucleotides washed with a washing solution. The sample environment, including temperature, pressure, and/or humidity, may be maintained in accordance with the particular samples (e.g., nucleic acid molecules) used and/or processing (e.g., incorporation reactions) carried out in the sample environment. Then, while implementing the fluid barriers and thereby maintaining the sample environment conditions, a detector protruding through a plate into the sample environment, configured as described elsewhere herein, may detect one or more detectable signals from the incorporated labeled nucleotides from the individually addressable locations in the array during relative motion of the detector and the substrate. For example, the substrate may be moved relative to the detector such as to allow the detector detects all individually addressable locations in (or a desired sub-area of) the substrate. In some instances, the substrate may undergo a rotational motion and a then a linear motion, in repeated cycles, such that after each rotational motion, the detector is able to scan an annular ring, and after each linear motion, the detector is positioned to scan another annular ring at a different radius from a center of the substrate. Alternatively or in addition to, the substrate may undergo only rotational motion. Alternatively or in addition to, the substrate may undergo only linear motion.

The fluid barriers maintained during the detection may provide barriers between the controlled sample environment and the external environment, and allow for low friction or zero friction relative motion between the detector and the sample, while maintaining a controlled sample environment. Beneficially, such barriers may allow for continuous scanning in a 100% or substantially 100% relative humidity environment. The barriers may prevent humidity from escaping the sample environment, which when escaped can condense and affect (e.g., corrode, foul, etc.) sensitive equipment, such as the optics. Furthermore, the barriers may prevent contaminants from the external environment from entering the sample environment, which may affect the fluidics and/or detection (e.g., imaging).

As will be appreciated, the systems, devices, and methods described herein may also have non-biological applications, such as for analyzing non-biological samples.

Computer Systems

Figure 7:
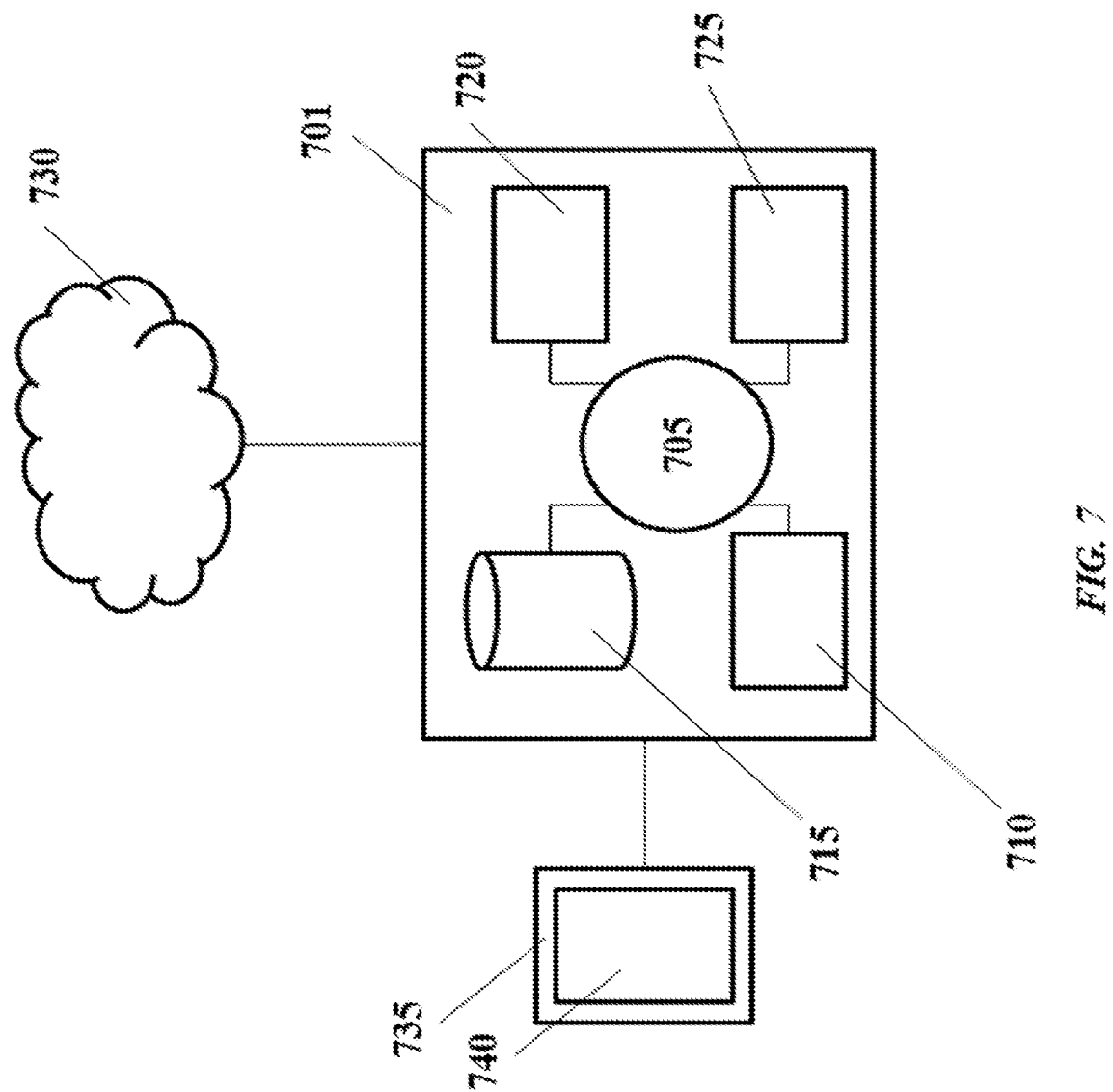
FIG. 7 shows a computer system that is programmed or otherwise configured to implement methods provided herein.

The present disclosure provides computer control systems that are programmed to implement methods of the disclosure. FIG. 7 shows a computer system 701 that is programmed or otherwise configured to process and/or detect a sample. The computer system 701 can regulate various aspects of methods and systems of the present disclosure. The computer system may be configured to regulate or communicate with any barrier system, or component thereof, and/or any processing system, or component thereof, described herein. For example, the computer system 701 may comprise, or be, a controller configured to communicate with the fluid flow unit, actuators, and/or detectors of the systems described herein.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences and user programs. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740 for providing, for example, detection results to a user. The UI may further present a console for configuring the fluid barrier systems, and/or components thereof (e.g., pressure-altering apparatus, environmental units, detectors, immersion enclosure, motion of detectors, motion of plates, motion of containers, motion of substrates, sample processing, etc.) of the present disclosure. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

EXAMPLES

Example 1. Imaging for Sequencing of a Nucleic Acid Molecule

Figure 8:
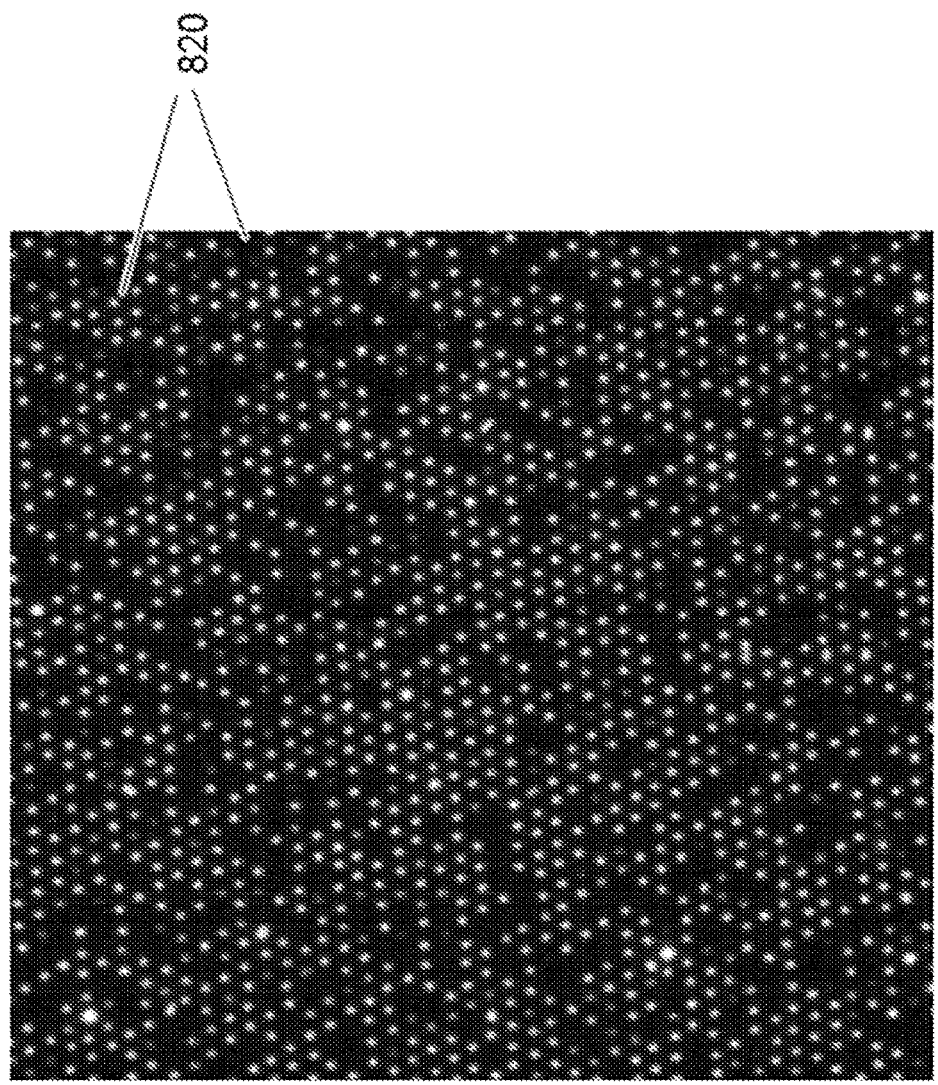
FIG. 8 shows an example of an image generated by imaging a substrate with a biological analyte immobilized thereto, in a sample environment of a barrier system of the present disclosure.

FIG. 8 shows an example of an image generated by imaging a substrate with a biological analyte immobilized thereto, in a sample environment of a barrier system of the present disclosure. A substrate 810 comprising a substantially planar array has immobilized thereto a plurality of biological analytes, such as nucleic acid molecules, at a plurality of individually addressable locations 820. The individually addressable locations may be randomly arranged or arranged in an ordered pattern. A biological analyte may be attached to a bead, which is immobilized to the array. A single bead may comprise a plurality of analytes. A bead may be associated with an individually addressable location. A plurality of fluorescent probes (e.g., a plurality of fluorescently-labeled, A, T, C, or G-containing nucleotides or analogs thereof) is dispensed onto the substrate 810, with aid of one or more operation units (e.g., reagent dispensers) at a chemical processing operation station. In some embodiments, the substrate is configured to rotate with respect to an axis. The substrate 810 is then subjected to conditions sufficient to conduct a reaction between at least one probe of the plurality of probes and the biological analyte, to couple the at least one probe to the biological analyte. The uncoupled probes are washed away, with aid of one or more operation units. At a detection operation station, while the fluid barrier is maintained, the coupling of the at least one probe to the biological analyte is detected using photometry, which comprises imaging at least a part of the substrate 810 (e.g., via scanning or fixed field imaging) and measuring the signal of each individually addressable location 820. Nucleic acid molecules comprising a nucleotide complementary to the fluorescent probes are fluorescent in an individually addressable location 820. The operations may then be iterated, at respective operation stations, and signals from an image are collated with signals from prior images of the same substrate to generate traces of signals in time for each biological analyte in each individually addressable location 820. The sequence of the plurality of fluorescent probes is known for each iteration of the operations, generating a known sequence for the analyte in each of the individually addressable locations 820.

Example 2. Signal Processing

Figure 9:
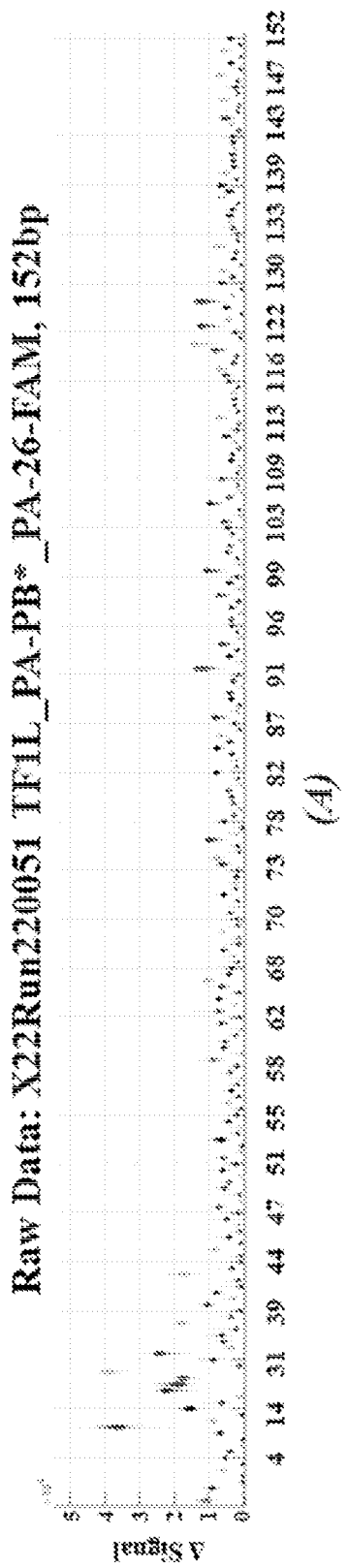
FIG. 9 shows signal data processed by imaging a substrate with a biological analyte immobilized thereto, in a sample environment of a barrier system of the present disclosure.
Figure 9:
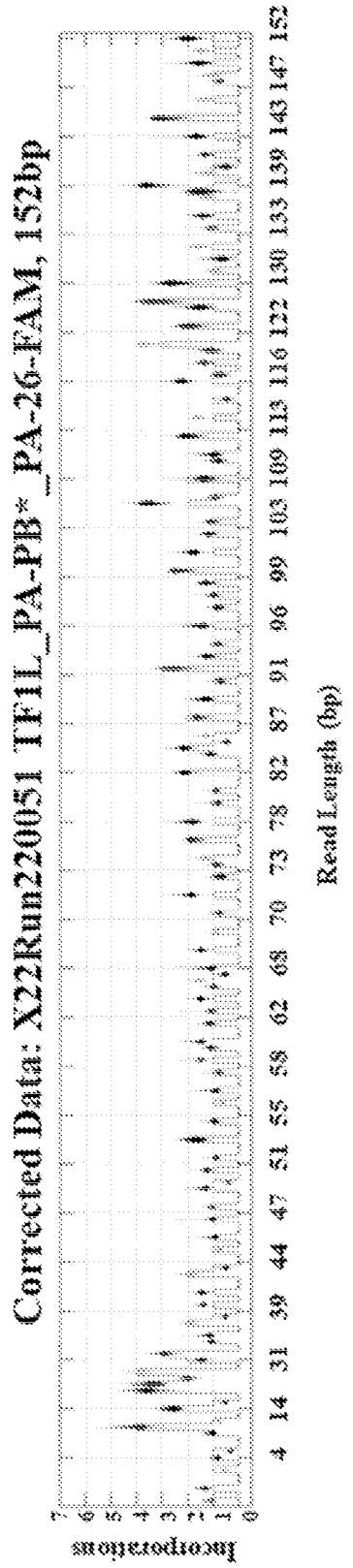

FIG. 9 shows signal data processed by imaging a substrate with a biological analyte immobilized thereto, in a sample environment of a barrier system of the present disclosure. A substrate comprising a substantially planar array has immobilized thereto nucleic acid molecules from *E. coli*. Sequencing by synthesis was performed using a flow-based chemistry, using the processing system described herein. Imaging was performed, while the fluid barrier of the barrier system was maintained, as described elsewhere herein. Panel (A) shows the signal distributions for a set of several hundred colonies, each a replicate of a single synthetic monotemplate. The x-axis is labeled with the length of the sequencing after each cycle (e.g., each chemistry flow operation). In Panel (B), the same data have been processed with a parametric model. The parametric model accounts for different template counts (amplitude) and background level for each colony. The signal is deconvolved with a model of lead and lag phasing and also accounts for global signal loss per cycle. In the example depicted here, the nominal phasing was 0.54% lag, 0.41% lead, and a signal loss of 0.45%. The residual systematic variation may be attributable to signal variation with sequence context can be further corrected using other algorithms (not shown).

What is claimed is:

1. A system for processing or analyzing an analyte, comprising: a chamber and a lid, wherein said chamber comprises an internal region and a substrate, wherein said analyte is immobilized adjacent to said substrate, wherein said lid is disposed adjacent to and not in mechanical contact with said chamber; and an environmental unit to maintain a first local environment and a second local environment within said internal region while said lid is not in mechanical contact with said chamber and during movement of said substrate within said chamber, wherein said environmental unit maintains (i) said first local environment at a first temperature or first temperature range, and (ii) said second local environment at a second temperature or second temperature range, wherein said first local environment is disposed above said second local environment, and wherein said first local environment is at or in proximity to said lid, wherein said second local environment is disposed at or near a surface of said substrate, and wherein said first temperature or first temperature range is higher than said second temperature or second temperature range.

2. The system of claim 1, wherein said environmental unit further maintains a third local environment within said internal region at a third temperature or third temperature range, wherein said third local environment is disposed below said first local environment and said second local environment.

3. The system of claim 2, wherein said third temperature or third temperature range is lower than said first temperature or first temperature range and higher than said second temperature or second temperature range.

4. The system of claim 2, wherein said third local environment is comprises a humidity source at or near a bottom of said internal region.

5. The system of claim 4, wherein said humidity source comprises a body of liquid.

6. The system of claim 1, wherein said environmental unit comprises one or more members selected from the group consisting of: a humidifier, dehumidifier, heater, heat exchanger, heating element, cooling element, and compressor.

7. The system of claim 1, wherein said lid moves relative to said chamber, or vice versa.

8. The system of claim 1, further comprising a fluid flow unit to provide fluid in bulk motion at a location disposed between said chamber and said lid.

9. The system of claim 8, wherein said fluid in bulk motion provides a partial vacuum in said location disposed between said chamber and said lid.

10. The system of claim 8, wherein said fluid in bulk motion generates negative pressure in said location disposed between said chamber and said lid.

11. The system of claim 8, wherein said fluid flow unit uses fluid from said internal region, an external region that is external to said chamber, or both to provide said fluid in bulk motion.

12. The system of claim 8, wherein said fluid comprises air.

13. The system of claim 8, wherein said fluid flow unit maintains said internal region at a first humidity or first humidity range, wherein said first humidity or first humidity range is different than a second humidity or second humidity range of an external region that is external to said chamber.

14. The system of claim 13, wherein said external region is at a room atmosphere or an ambient atmosphere.

15. The system of claim 13, wherein said internal region has a relative humidity greater than 90%.

16. The system of claim 1, further comprising a detection unit that is at least partially contained in said internal region.

17. The system of claim 16, wherein a first portion of said detection unit comprises an optical imaging objective that is at least partially immersed in an immersion fluid in contact with said substrate in said internal region, and wherein a second portion of said detection unit is in an external region that is external to said chamber.

18. The system of claim 16, wherein said detection unit is fixed relative to said lid.

19. The system of claim 1, wherein said substrate is rotatable relative to said chamber.

20. The system of claim 1, wherein said internal region comprises a third local environment at a bottom of said chamber, wherein said bottom of said chamber comprises a body of liquid that generates vapor, wherein said body of liquid is maintained at third temperature or third temperature range between said first temperature or temperature range and said second temperature or temperature range.

* * * * *